US012632295B2

(12) United States Patent
Read et al.

(10) Patent No.: US 12,632,295 B2
(45) Date of Patent: May 19, 2026

(54) EDGE FRAMEWORK ON CONSTRAINED DEVICE

(71) Applicant: Schneider Electric Systems USA, Inc., Foxboro, MA (US)

(72) Inventors: Brooks Read, Foxboro, MA (US); Briane Ritchie, Foxboro, MA (US); Matthew Michel, Foxboro, MA (US); Mark Bertolina, Foxboro, MA (US); Vijay Vallala, Foxboro, MA (US); Harikrishnan Baskaran, Foxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 466 days.

(21) Appl. No.: 18/376,871

(22) Filed: Oct. 5, 2023

(65) Prior Publication Data

US 2024/0118921 A1 Apr. 11, 2024

Related U.S. Application Data

(60) Provisional application No. 63/414,660, filed on Oct. 10, 2022.

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01); *G06F 9/5083* (2013.01)

(58) Field of Classification Search
None
See application file for complete search history.

(56) References Cited

U.S. PATENT DOCUMENTS 5,333,114 A * 7/1994 Warrior .............. G05B 19/4185
700/67
5,960,214 A * 9/1999 Sharpe, Jr. ......... G05B 19/0423
719/321

(Continued)

FOREIGN PATENT DOCUMENTS

DE 102021101498 A1 7/2022
WO 2022069034 A1 4/2022

OTHER PUBLICATIONS

International Search Report dated Feb. 16, 2024 for corresponding International Application No. PCT/US23/34612, 9 pages.

*Primary Examiner* — Van H Nguyen
(74) *Attorney, Agent, or Firm* — Quinn IP Law

(57) ABSTRACT

An embedded device includes an Ethernet-APL interface through which to conduct communications and receive power over an Ethernet-APL network connection; an analog communication interface for establishing an analog connection with a field device/instrument; a memory; and a processor(s). The processor(s), in communication with the memory, is configured to: apply a firmware framework to implement a embedded platform without an operating system; and perform prioritized, multi-tasking of a plurality of run-to-complete tasks for monitoring and/or control of a plant or process according to the embedded platform. The tasks can include communications with at least one field device/instrument through analog connection via the analog communication interface. The communications include at least receiving measurement data from the at least one field device/instrument or outputting control data to the at least one field device/instrument. The embedded device can be a constrained edge device.

21 Claims, 19 Drawing Sheets

(56)                    References Cited

U.S. PATENT DOCUMENTS

| | | | | |
|---|---|---|---|---|
| 5,980,078 | A * | 11/1999 | Krivoshein | ......... G06F 9/44505 |
| | | | | 700/1 |
| 8,301,676 | B2 * | 10/2012 | Miller | ................... G05B 15/02 |
| | | | | 708/300 |
| 9,634,858 | B2 * | 4/2017 | Reller | .............. H04L 12/40045 |
| 10,291,506 | B2 * | 5/2019 | Mixer | ................... H04L 43/04 |
| 10,386,824 | B2 * | 8/2019 | Jundt | ................. H04L 41/0806 |
| 10,386,825 | B2 * | 8/2019 | Jundt | ................. H04L 41/0806 |
| 10,432,412 | B2 * | 10/2019 | Alley | ..................... H04L 12/10 |
| 10,663,956 | B2 * | 5/2020 | Jundt | ................ G05B 19/4186 |
| 11,720,068 | B2 * | 8/2023 | Zhang | ..................... G06N 5/04 |
| | | | | 706/13 |
| 11,875,236 | B2 * | 1/2024 | Nixon | ..................... G06F 13/38 |
| 12,301,380 | B2 * | 5/2025 | Swarr | .................. G06F 13/382 |
| 2007/0057783 | A1 | 3/2007 | Reller | |
| 2018/0139062 | A1 | 5/2018 | Alley et al. | |
| 2022/0129782 | A1 | 4/2022 | Nixon et al. | |

* cited by examiner

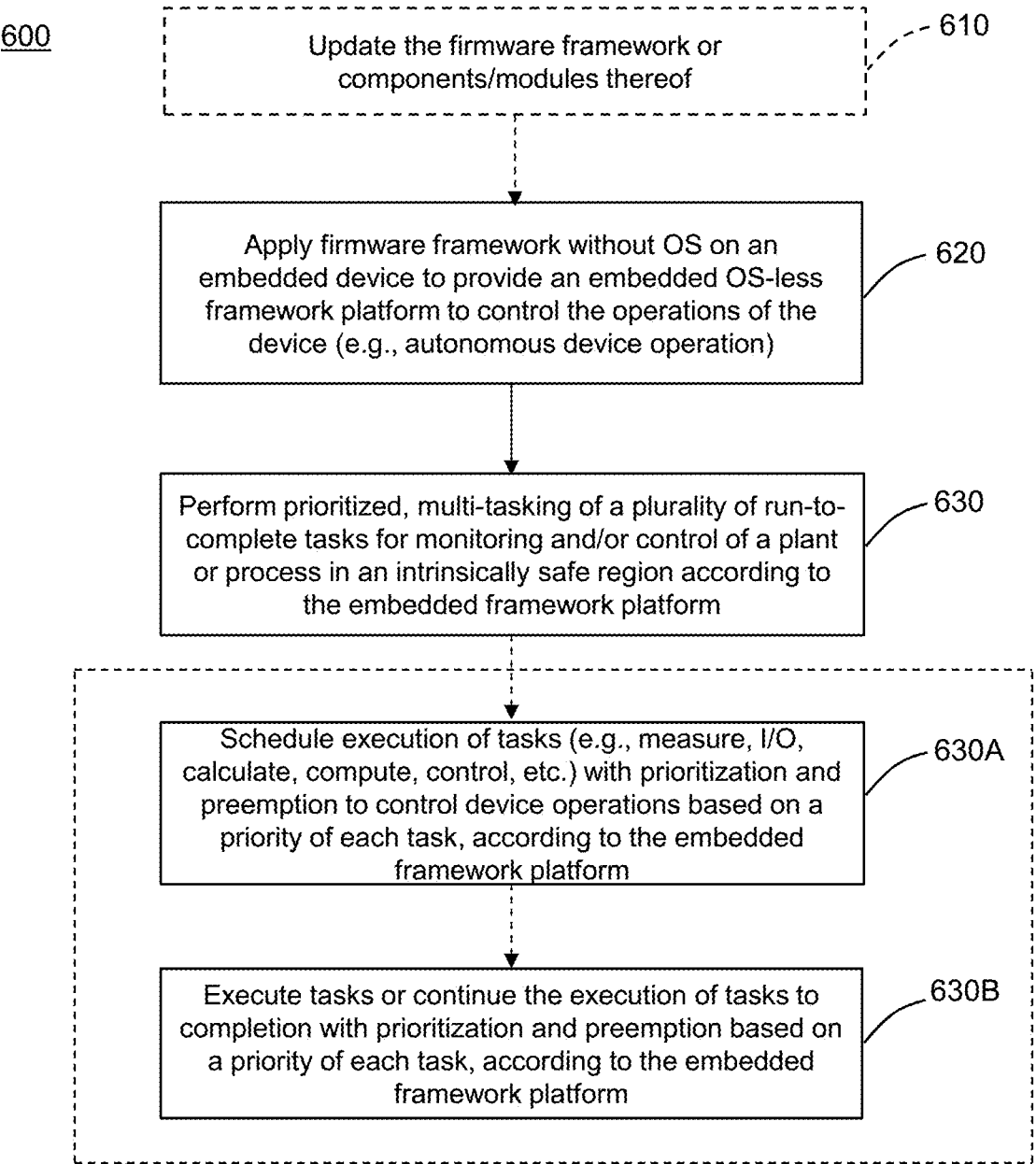

600

Update the firmware framework or components/modules thereof — 610

Apply firmware framework without OS on an embedded device to provide an embedded OS-less framework platform to control the operations of the device (e.g., autonomous device operation) — 620

Perform prioritized, multi-tasking of a plurality of run-to-complete tasks for monitoring and/or control of a plant or process in an intrinsically safe region according to the embedded framework platform — 630

Schedule execution of tasks (e.g., measure, I/O, calculate, compute, control, etc.) with prioritization and preemption to control device operations based on a priority of each task, according to the embedded framework platform — 630A Execute tasks or continue the execution of tasks to completion with prioritization and preemption based on a priority of each task, according to the embedded framework platform — 630B

FIG. 6

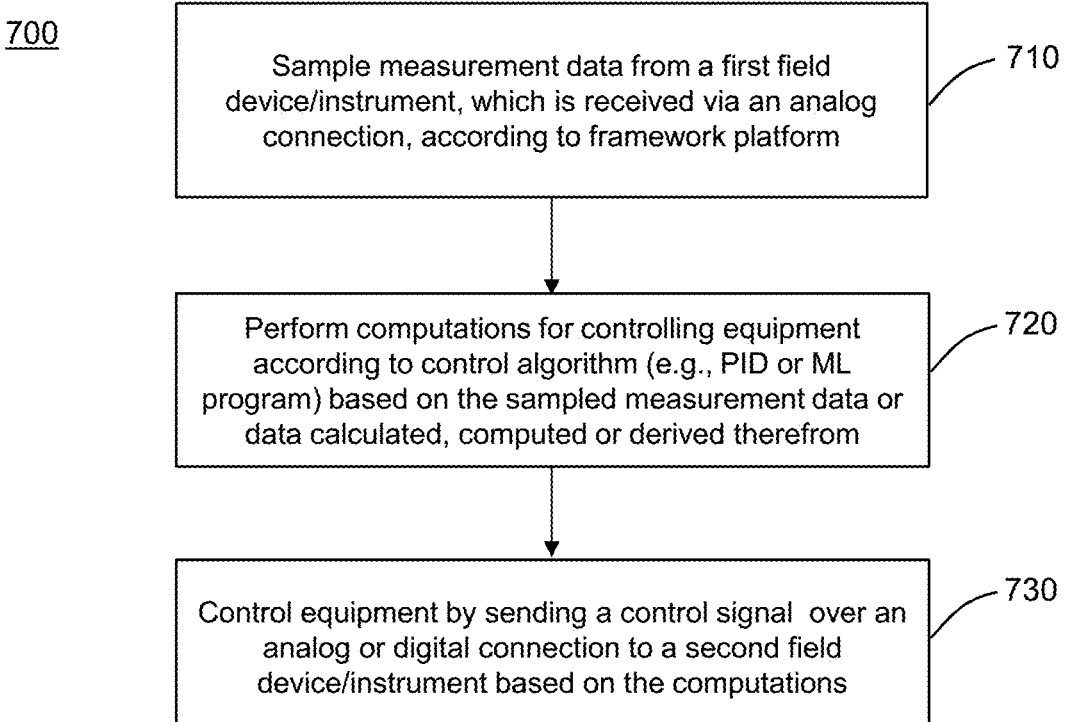

700

Sample measurement data from a first field device/instrument, which is received via an analog connection, according to framework platform — 710

Perform computations for controlling equipment according to control algorithm (e.g., PID or ML program) based on the sampled measurement data or data calculated, computed or derived therefrom — 720

Control equipment by sending a control signal over an analog or digital connection to a second field device/instrument based on the computations — 730

FIG. 7

Data Manager Service Items    800

FIG. 8A

OPAS Data Types  850

FIG. 8B

OPAS Data Types (Continued)

```
const CIEC_UINT BadReferenceLocalOnly                  = 0x80680000;
const CIEC_UINT BadNoDeleteRights                      = 0x80690000;
const CIEC_UINT UncertainReferenceNotDeleted           = 0x40BC0000;
const CIEC_UINT BadServerIndexInvalid                  = 0x806A0000;
const CIEC_UINT BadViewIdUnknown                       = 0x806B0000;
const CIEC_UINT BadViewTimestampInvalid                = 0x80C90000;
const CIEC_UINT BadViewParameterMismatch               = 0x80CA0000;
const CIEC_UINT BadViewVersionInvalid                  = 0x80CB0000;
const CIEC_UINT UncertainNotAllNodesAvailable          = 0x40C00000;
const CIEC_UINT GoodResultsMayBeIncomplete             = 0x00BA0000;
const CIEC_UINT BadNotTypeDefinition                   = 0x80C80000;
const CIEC_UINT UncertainReferenceOutOfServer          = 0x406C0000;
const CIEC_UINT BadTooManyMatches                      = 0x806D0000;
const CIEC_UINT BadQueryTooComplex                     = 0x806E0000;
const CIEC_UINT BadNoMatch                             = 0x806F0000;
const CIEC_UINT BadMaxAgeInvalid                       = 0x80700000;
const CIEC_UINT BadSecurityModeInsufficient            = 0x80E60000;
const CIEC_UINT BadHistoryOperationInvalid             = 0x80710000;
const CIEC_UINT BadHistoryOperationUnsupported         = 0x80720000;
const CIEC_UINT BadInvalidTimestampArgument            = 0x80BD0000;
const CIEC_UINT BadWriteNotSupported                   = 0x80730000;
const CIEC_UINT BadTypeMismatch                        = 0x80740000;
const CIEC_UINT BadMethodInvalid                       = 0x80750000;
const CIEC_UINT BadArgumentsMissing                    = 0x80760000;
const CIEC_UINT BadNotExecutable                       = 0x81110000;
const CIEC_UINT BadTooManySubscriptions                = 0x80770000;
const CIEC_UINT BadTooManyPublishRequests              = 0x80780000;
const CIEC_UINT BadNoSubscription                      = 0x80790000;
const CIEC_UINT BadSequenceNumberUnknown               = 0x807A0000;
const CIEC_UINT BadMessageNotAvailable                 = 0x807B0000;
const CIEC_UINT BadInsufficientClientProfile           = 0x807C0000;
const CIEC_UINT BadStateNotActive                      = 0x80BF0000;
const CIEC_UINT BadAlreadyExists                       = 0x81150000;
const CIEC_UINT BadTcpServerTooBusy                    = 0x807D0000;
const CIEC_UINT BadTcpMessageTypeInvalid               = 0x807E0000;
const CIEC_UINT BadTcpSecureChannelUnknown             = 0x807F0000;
const CIEC_UINT BadTcpMessageTooLarge                  = 0x80800000;
const CIEC_UINT BadTcpNotEnoughResources               = 0x80810000;
const CIEC_UINT BadTcpInternalError                    = 0x80820000;
const CIEC_UINT BadTcpEndpointUrlInvalid               = 0x80830000;
const CIEC_UINT BadRequestInterrupted                  = 0x80840000;
const CIEC_UINT BadRequestTimeout                      = 0x80850000;
const CIEC_UINT BadSecureChannelClosed                 = 0x80860000;
const CIEC_UINT BadSecureChannelTokenUnknown           = 0x80870000;
const CIEC_UINT BadSequenceNumberInvalid               = 0x80880000;
const CIEC_UINT BadProtocolVersionUnsupported          = 0x80BE0000;
const CIEC_UINT BadConfigurationError                  = 0x80890000;
const CIEC_UINT BadNotConnected                        = 0x808A0000;
const CIEC_UINT BadDeviceFailure                       = 0x808B0000;
const CIEC_UINT BadSensorFailure                       = 0x808C0000;
const CIEC_UINT BadOutOfService                        = 0x808D0000;
const CIEC_UINT BadDeadbandFilterInvalid               = 0x808E0000;
```

FIG. 8C

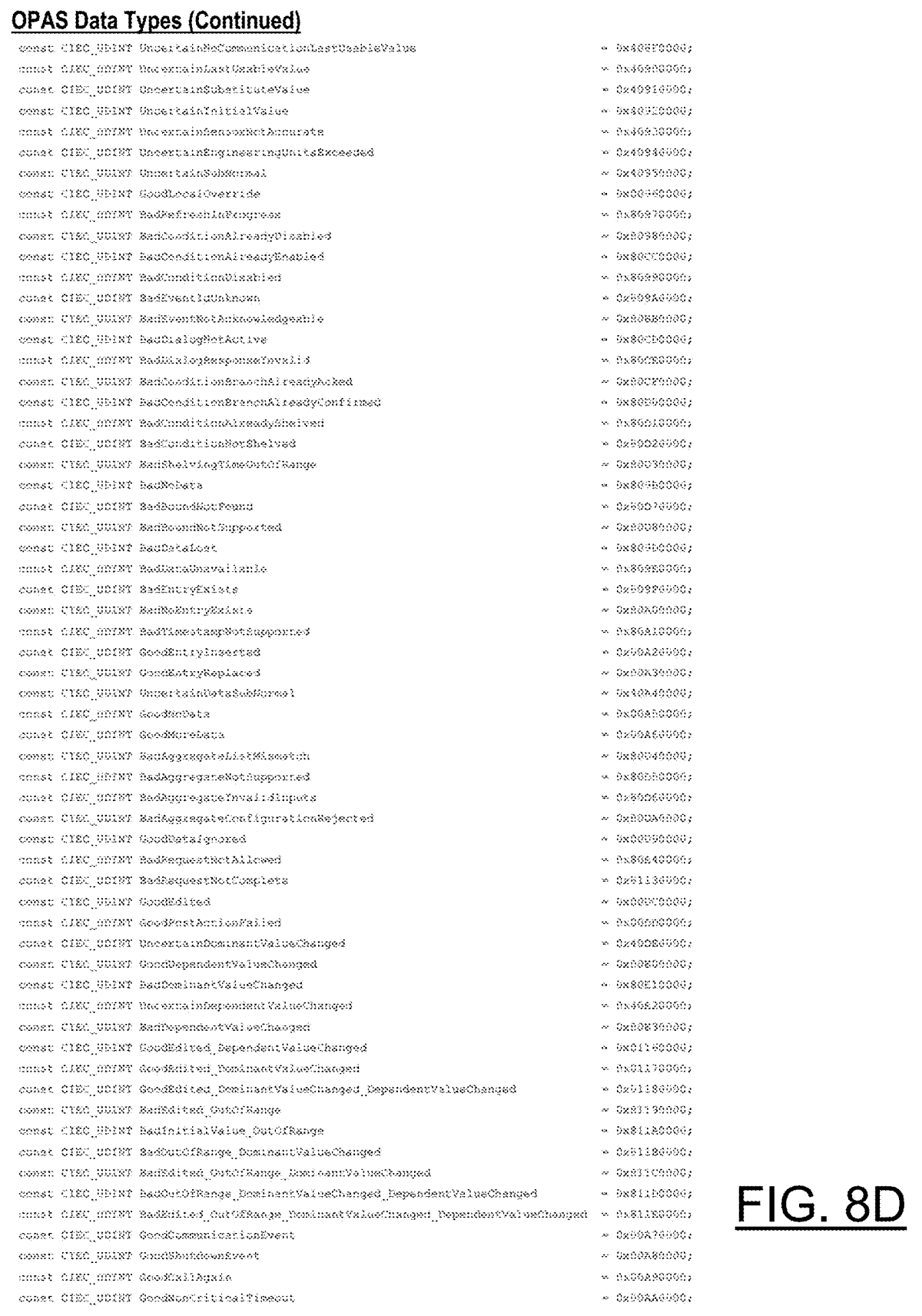

OPAS Data Types (Continued)

```
const CIEC_UDINT UncertainNoCommunicationLastUsableValue    = 0x408F0000;
const CIEC_UDINT UncertainLastUsableValue                   = 0x40900000;
const CIEC_UDINT UncertainSubstituteValue                   = 0x40910000;
const CIEC_UDINT UncertainInitialValue                      = 0x40920000;
const CIEC_UDINT UncertainSensorNotAccurate                 = 0x40930000;
const CIEC_UDINT UncertainEngineeringUnitsExceeded          = 0x40940000;
const CIEC_UDINT UncertainSubNormal                         = 0x40950000;
const CIEC_UDINT GoodLocalOverride                          = 0x00960000;
const CIEC_UDINT BadRefreshInProgress                       = 0x80970000;
const CIEC_UDINT BadConditionAlreadyDisabled                = 0x80980000;
const CIEC_UDINT BadConditionAlreadyEnabled                 = 0x80CC0000;
const CIEC_UDINT BadConditionDisabled                       = 0x80990000;
const CIEC_UDINT BadEventIdUnknown                          = 0x809A0000;
const CIEC_UDINT BadEventNotAcknowledgeable                 = 0x80BB0000;
const CIEC_UDINT BadDialogNotActive                         = 0x80CD0000;
const CIEC_UDINT BadDialogResponseInvalid                   = 0x80CE0000;
const CIEC_UDINT BadConditionBranchAlreadyAcked             = 0x80CF0000;
const CIEC_UDINT BadConditionBranchAlreadyConfirmed         = 0x80D00000;
const CIEC_UDINT BadConditionAlreadyShelved                 = 0x80D10000;
const CIEC_UDINT BadConditionNotShelved                     = 0x80D20000;
const CIEC_UDINT BadShelvingTimeOutOfRange                  = 0x80D30000;
const CIEC_UDINT BadNoData                                  = 0x809B0000;
const CIEC_UDINT BadBoundNotFound                           = 0x80D70000;
const CIEC_UDINT BadBoundNotSupported                       = 0x80D80000;
const CIEC_UDINT BadDataLost                                = 0x809D0000;
const CIEC_UDINT BadDataUnavailable                         = 0x809E0000;
const CIEC_UDINT BadEntryExists                             = 0x809F0000;
const CIEC_UDINT BadNoEntryExists                           = 0x80A00000;
const CIEC_UDINT BadTimestampNotSupported                   = 0x80A10000;
const CIEC_UDINT GoodEntryInserted                          = 0x00A20000;
const CIEC_UDINT GoodEntryReplaced                          = 0x00A30000;
const CIEC_UDINT UncertainDataSubNormal                     = 0x40A40000;
const CIEC_UDINT GoodNoData                                 = 0x00A50000;
const CIEC_UDINT GoodMoreData                               = 0x00A60000;
const CIEC_UDINT BadAggregateListMismatch                   = 0x80D40000;
const CIEC_UDINT BadAggregateNotSupported                   = 0x80D50000;
const CIEC_UDINT BadAggregateInvalidInputs                  = 0x80D60000;
const CIEC_UDINT BadAggregateConfigurationRejected          = 0x80DA0000;
const CIEC_UDINT GoodDataIgnored                            = 0x00D90000;
const CIEC_UDINT BadRequestNotAllowed                       = 0x80E40000;
const CIEC_UDINT BadRequestNotComplete                      = 0x81130000;
const CIEC_UDINT GoodEdited                                 = 0x00DC0000;
const CIEC_UDINT GoodPostActionFailed                       = 0x00DD0000;
const CIEC_UDINT UncertainDominantValueChanged              = 0x40DE0000;
const CIEC_UDINT GoodDependentValueChanged                  = 0x00E00000;
const CIEC_UDINT BadDominantValueChanged                    = 0x80E10000;
const CIEC_UDINT UncertainDependentValueChanged             = 0x40E20000;
const CIEC_UDINT BadDependentValueChanged                   = 0x80E30000;
const CIEC_UDINT GoodEdited_DependentValueChanged           = 0x01160000;
const CIEC_UDINT GoodEdited_DominantValueChanged            = 0x01170000;
const CIEC_UDINT GoodEdited_DominantValueChanged_DependentValueChanged = 0x01180000;
const CIEC_UDINT BadEdited_OutOfRange                       = 0x81190000;
const CIEC_UDINT BadInitialValue_OutOfRange                 = 0x811A0000;
const CIEC_UDINT BadOutOfRange_DominantValueChanged         = 0x811B0000;
const CIEC_UDINT BadEdited_OutOfRange_DominantValueChanged  = 0x811C0000;
const CIEC_UDINT BadOutOfRange_DominantValueChanged_DependentValueChanged = 0x811D0000;
const CIEC_UDINT BadEdited_OutOfRange_DominantValueChanged_DependentValueChanged = 0x811E0000;
const CIEC_UDINT GoodCommunicationEvent                     = 0x00A70000;
const CIEC_UDINT GoodShutdownEvent                          = 0x00A80000;
const CIEC_UDINT GoodCallAgain                              = 0x00A90000;
const CIEC_UDINT GoodNonCriticalTimeout                     = 0x00AA0000;
```

FIG. 8D

Figure 8E:
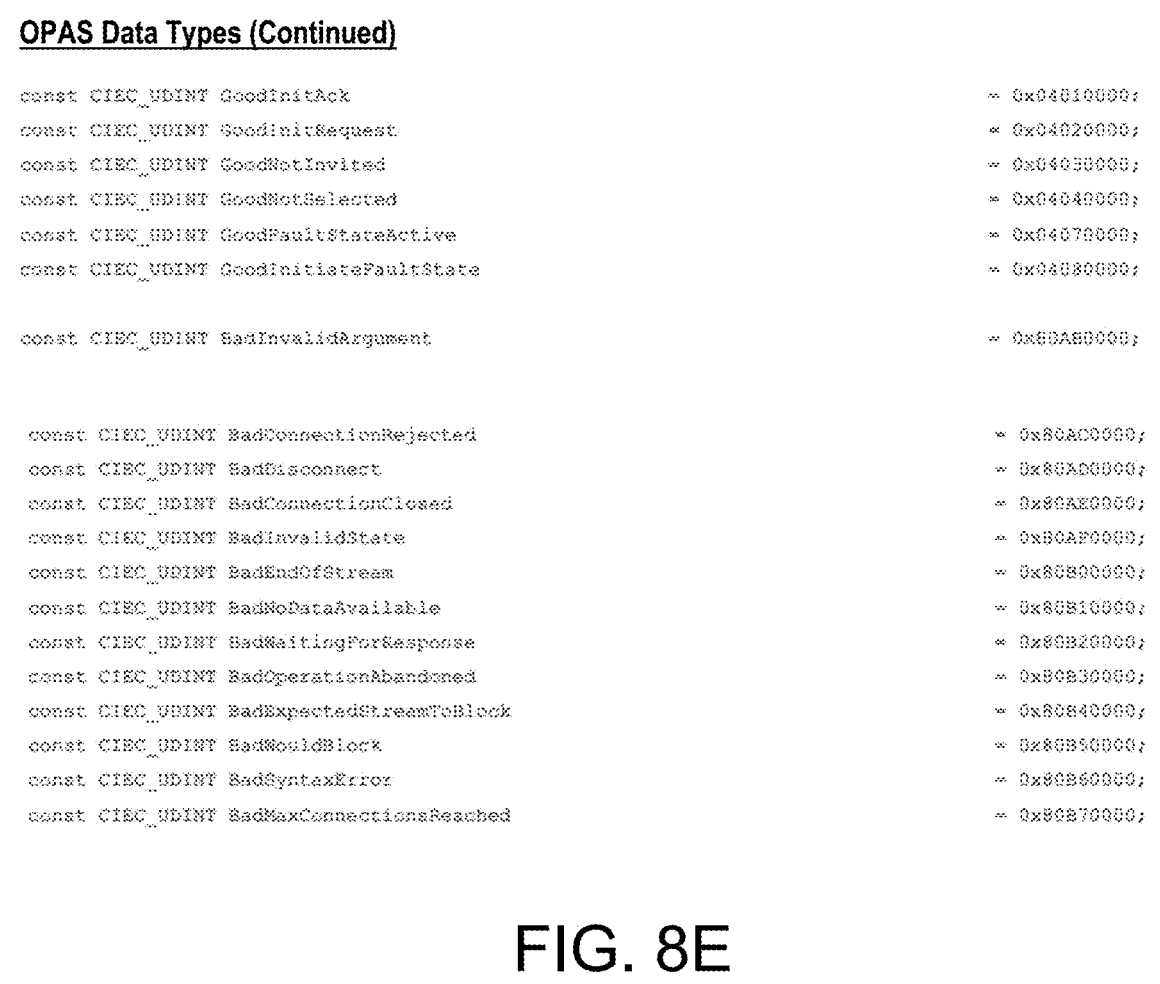

OPAS Data Types (Continued)

```
const CIEC_UDINT GoodInitAck                        ~ 0x04010000;
const CIEC_UDINT GoodInitRequest                    ~ 0x04020000;
const CIEC_UDINT GoodNotInvited                     ~ 0x04030000;
const CIEC_UDINT GoodNotSelected                    ~ 0x04040000;
const CIEC_UDINT GoodFaultStateActive               ~ 0x04070000;
const CIEC_UDINT GoodInitiateFaultState             ~ 0x04080000;

const CIEC_UDINT BadInvalidArgument                 ~ 0x80AB0000;

const CIEC_UDINT BadConnectionRejected              ~ 0x80AC0000;
const CIEC_UDINT BadDisconnect                      ~ 0x80AD0000;
const CIEC_UDINT BadConnectionClosed                ~ 0x80AE0000;
const CIEC_UDINT BadInvalidState                    ~ 0x80AF0000;
const CIEC_UDINT BadEndOfStream                     ~ 0x80B00000;
const CIEC_UDINT BadNoDataAvailable                 ~ 0x80B10000;
const CIEC_UDINT BadWaitingForResponse              ~ 0x80B20000;
const CIEC_UDINT BadOperationAbandoned              ~ 0x80B30000;
const CIEC_UDINT BadExpectedStreamToBlock           ~ 0x80B40000;
const CIEC_UDINT BadWouldBlock                      ~ 0x80B50000;
const CIEC_UDINT BadSyntaxError                     ~ 0x80B60000;
const CIEC_UDINT BadMaxConnectionsReached           ~ 0x80B70000;
```

Table 1, File System Use Cases and Usages

| Uses Cases | File Type | Required | Estimated Usage |
|---|---|---|---|
| Logging – logging for alerts/warnings/asserts | text (UTF-16) | yes | >12KB circular |
| OPC/UA configuration XML file | XML/binary | opt | ~32KB |
| 61499 application downloaded to device | binary | opt | ~48KB |
| Initial device configuration such as connection details ip/ports | text (UTF-16) | via webpages for demo | ~4KB |
| Web Page Serving | html | yes | ~48KB |
| TinyML configuration | Binary with signature | opt | ** |
| file download for firmware update, OPC-UA config, network config etc.. | binary w/signature | opt for demo /req for product | 2x2MB |

\*    Usage is limited to 4KB chunks with current HW

\*\*    Learning application specific for size

FIG. 9

Table 2, File System Requirements by Function

1000

| Function | States | | | | | | | |
|---|---|---|---|---|---|---|---|---|
| | Online | | Offline | | Startup | | Shutting Down | |
| | Read Access | Write Access | Read Access | Write Access | Read Access | Write Access | Read Access | Write Access |
| System Logger | yes | yes | yes | yes | no | yes | no | yes |
| System Admin | yes | yes | yes | yes | yes | no | no | no |
| OPC/UA | yes | no | no | no | yes | no | no | no |
| 61499 Runtime | yes | no | no | no | yes | no | no | no |
| Web Server | yes | yes (subject to RBA) | yes | yes (subject to RBA) | yes | no | no | no |
| Hart Master | yes | no | no | no | yes | no | no | no |
| File system | yes | yes | yes | yes | yes | no | yes | no |
| Network Interface | yes | no | yes | no | yes | no | no | no |
| Tiny ML | tbd | tbd | tbd | tbd | tbd | tbd | tbd | tbd |
| Firmware upgrader | no | no | yes | yes (subject to RBA) | yes | no | no | no |

Tbd for Tiny ML - Learning application specific

FIG. 10

Table 3, External Roles

1100

| User Roles | Permissions | Session required |
|---|---|---|
| Admin | Read/Write All | Yes |
| Maintenance | Read/Write Selected (TBD) | Yes |
| User | Read/Write Selected (TBD) | Yes |
| Monitor | Read Only Logs | no |

FIG. 11

Figure 12:
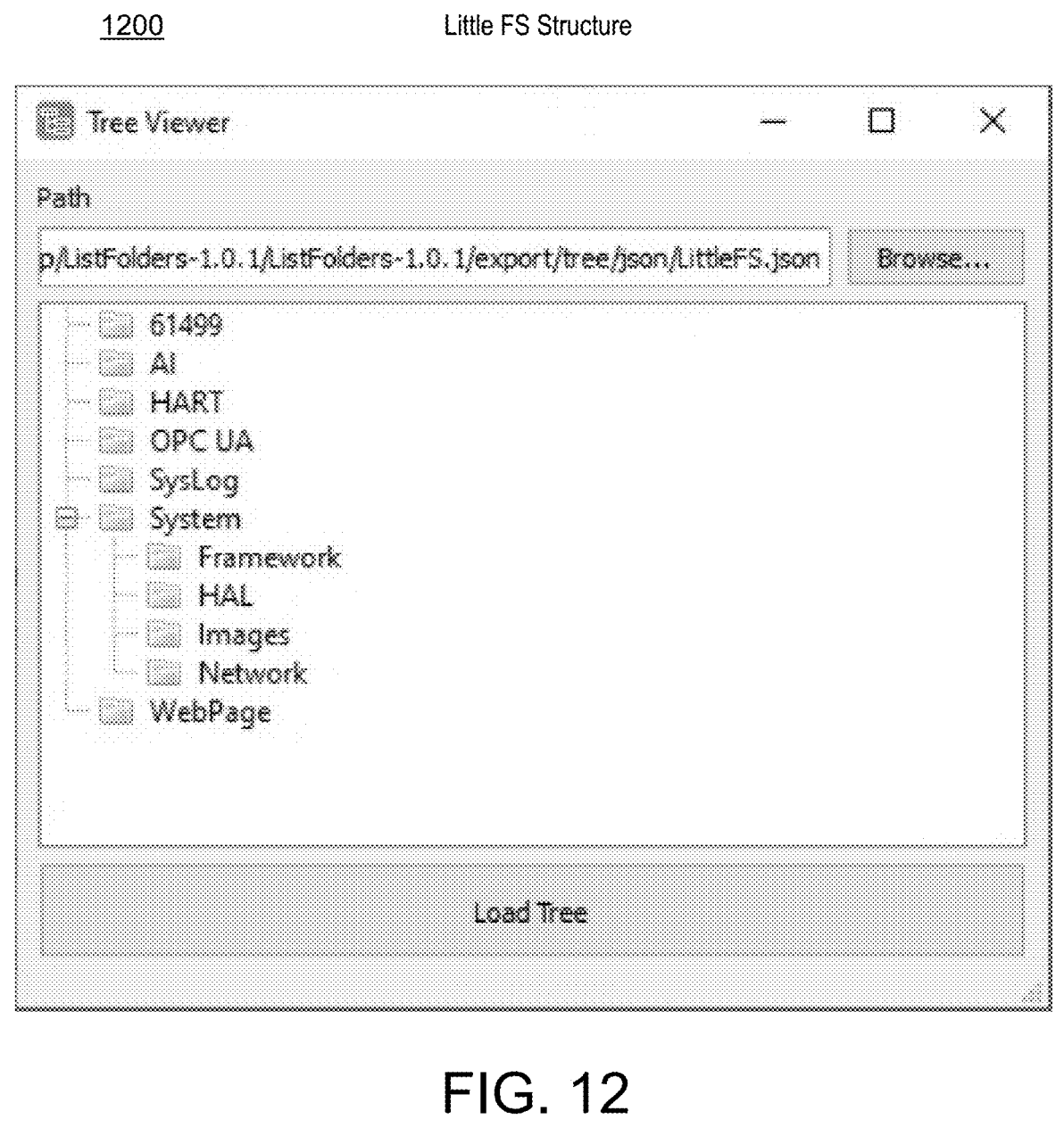

1200                              Little FS Structure

Tree Viewer    —  □  ✕

Path p/ListFolders-1.0.1/ListFolders-1.0.1/export/tree/json/LittleFS.json    Browse...

- 61499
- AI
- HART
- OPC UA
- SysLog
- System
  - Framework
  - HAL
  - Images
  - Network
- WebPage Load Tree

EDGE FRAMEWORK ON CONSTRAINED DEVICE

The present application claims priority to co-pending U.S. Provisional Patent Application Ser. No. 63/414,660, filed Oct. 10, 2022, which is entitled EDGE FRAMEWORK ON CONSTRAINED DEVICE. The disclosure of the above-identified prior U.S. patent application, in its entirety, is considered as being part of the present application, and thus, is incorporated herein by reference in its entirety.

FIELD

This disclosure relates generally to systems and methods for intrinsically safe environments, and more particularly, to systems and methods directed to an embedded device with an embedded firmware framework for facilitating monitoring and/or control of operations in an industrial process or plant and their field devices/instruments in an intrinsically safe environment.

BACKGROUND

As is known, an industrial operation or plant typically includes a plurality of industrial equipment. The industrial equipment can come in a variety of forms and may be associated with various processes, for example, depending on the industrial operation. For example, an industrial operation may include one or more Field Devices (e.g., RTUs, PLCs, actuators, sensors, HMIs) that are used to perform, analyze and/or control process variable measurements. These process variable measurements may include pressure, flow, level, and temperature, for example. The industrial operation or plant, and its associated equipment and process(es), may be operated and controlled using a Distributed Control System (DCS) in some instances.

SUMMARY

In accordance with an embodiment, 1, an embedded device includes: at least one network interface including an Ethernet-APL interface through which to conduct communications and receive power over an Ethernet-APL network connection; at least one analog communication interface for establishing an analog connection with a field device/instrument; a memory; and a processor(s). The processor(s), in communication with the memory, is configured to: apply a firmware framework to implement an embedded platform without an operating system; and perform prioritized, multi-tasking of a plurality of run-to-complete tasks for monitoring and/or control of a plant or process according to the embedded platform. The at least one of the tasks includes communications with at least one field device/instrument through analog connection via the analog communication interface. The communications include at least receiving measurement data from the at least one field device/instrument or outputting control data to the at least one field device/instrument.

In various embodiments, the embedded device further includes at least one digital communication interface for establishing a digital connection with a field device/instrument. Furthermore, the at least one field device/instrument can include a first field device/instrument and a second field device/instrument. The processor(s) can receive the measurement data from the first field device/instrument across an analog connection via the analog communication interface, and can output control signal or data based on the measurement data to the second field device/instrument via the digital communication interface.

In various embodiments, the firmware framework can provide for simultaneous, analog measurement via an analog connection, digital I/O via a digital connection, compute, and control on a signal microcontroller-based embedded platform with no operating system.

In various embodiments, the firmware framework can provide for network connections over the at least one network communication interface and simultaneous Field Bus connections over the at least one digital communication interface.

In various embodiments, the firmware framework can provide for scheduling of prioritized tasks using a combination of active object unified modeling language or UML state machines and real-time threaded task execution of open source stacks.

In various embodiments, the firmware framework can include a centralized data manager for abstract data subscriptions.

In various embodiments, the firmware framework provides for measurement calculations and Machine Learning computations to run in a prioritized scheme while servicing I/O on a microcontroller with the processor(s).

In various embodiments, the processor(s) can be configured to perform load balancing for performance based on priorities using run-to-completion model tasks combined with pre-emptive/prioritized multi-tasking.

In various embodiments, the firmware framework can include built-in instrumentation tasks, which are configured to run at a lowest priority to allow a user to measure performance, to task tune priorities, and/or to set I/O latency watermarks.

In various embodiments, the at least one field device/instrument can include a transmitter, sensor, positioner, or actuator. The embedded device can be an Advanced Physical Layer or APL bridge device, or a constrained edge device. The embedded device also can be configured to operation in an intrinsically safe region of an industrial process or plant.

In accordance with an embodiment, a method is provided for operating an embedded device, such as described above.

In accordance with an embodiment, a tangible computer medium is provided for storing computer executable code, which when executed by a processor(s), is configured to implement a method for operating an embedded device, such as described above.

It is understood that there are many features, advantages and aspects associated with the disclosed invention, as will be appreciated from the discussions below and drawings.

BRIEF DESCRIPTION OF THE DRAWINGS

The foregoing features of the disclosure, as well as the disclosure itself may be more fully understood from the following detailed description of the drawings, in which.

3

Figure 5:
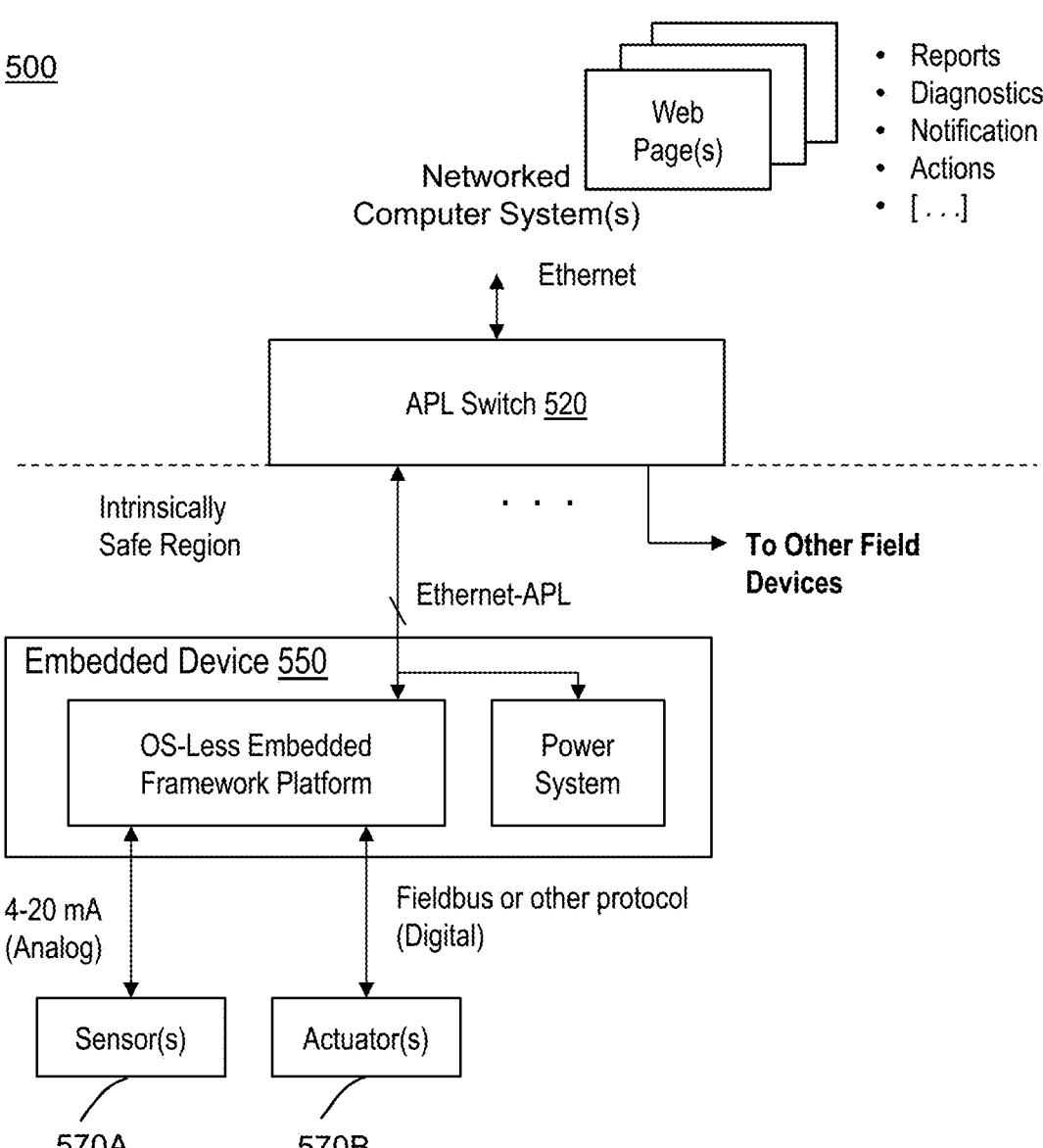
Figure 13:
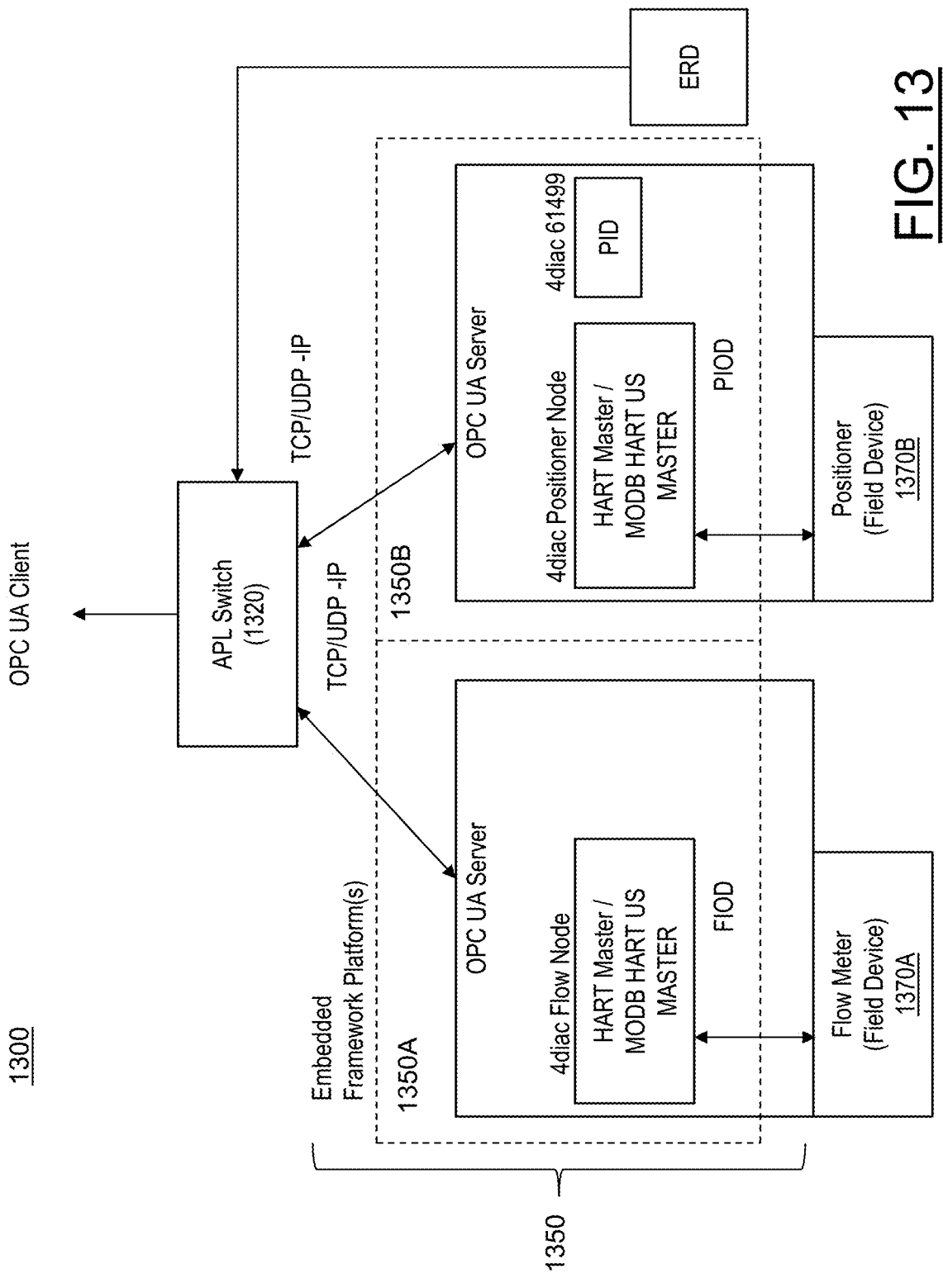
Figure 14:
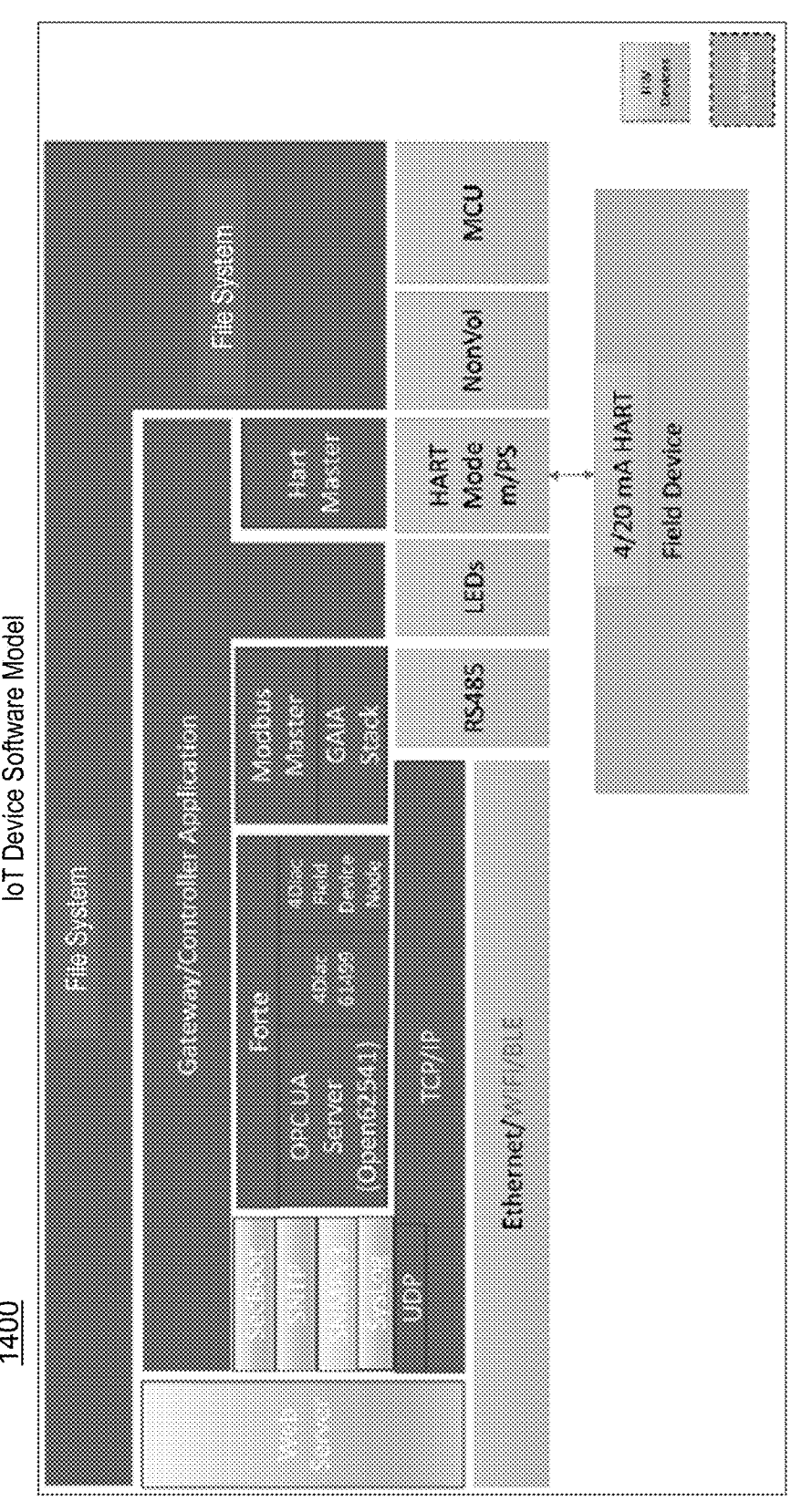
Figure 15:
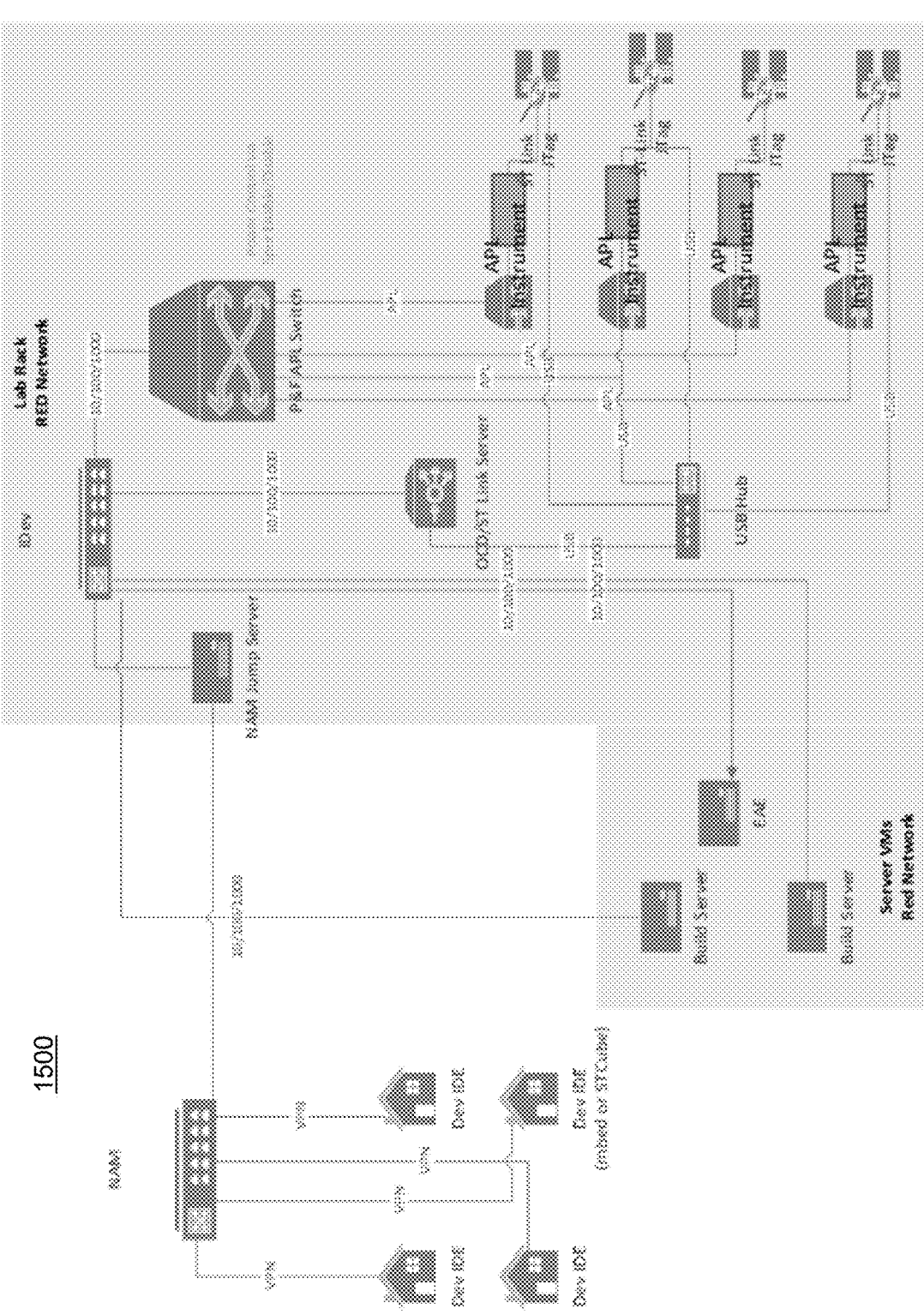

FIG. 5 illustrates an example system with an example embedded device and field devices/instruments in accordance with embodiments of the disclosure;

FIG. 6 illustrates a flow diagram of an example process by which operations of an embedded device is performed in accordance with embodiments of the disclosure;

FIG. 7 illustrates a flow diagram of an example process by which operations of an embedded device is performed to monitor and control an operation(s) of a process or plant in accordance with embodiments of the disclosure;

FIGS. 8A, 8B, 8C, 8D and 8E illustrates example service items and OPAS data types for use in an embedded device in accordance with embodiments of the disclosure;

FIG. 9 illustrates example use cases and usages for an embedded device in accordance with embodiments of the disclosure;

FIG. 10 illustrates example requirements by function for a file system of an embedded device in accordance with embodiments of the disclosure;

FIG. 11 illustrates example external roles in a network system with an embedded device in accordance with embodiments of the disclosure;

FIG. 12 illustrates an example Little FS Structure for an embedded device in accordance with embodiments of the disclosure;

FIG. 13 illustrates an example architecture for an embedded device in accordance with embodiments of the disclosure;

FIG. 14 illustrates an example IoT device software model for an embedded device in accordance with embodiments of the disclosure; and FIG. 15 illustrates an example system architecture in accordance with embodiments of the disclosure.

DETAILED DESCRIPTION OF EXAMPLE EMBODIMENTS

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification are collected here.

As used herein, the term "Edge" is used to refer to Layer 0 of the Purdue Network Model for Industrial Control Systems.

As used herein, the term "Field Device" is used to refer to Intelligent field instruments with embedded Control/Compute/measurement capability implemented on lower power embedded Microcontroller based platforms.

As used herein, the term "Machine Learning (ML)" is used to refer to the use and development of software that is able to learn and adapt without following explicit instructions, by using algorithms and statistical models to analyze and draw inferences from patterns in data.

As used herein, the term "Embedded Device" is used to refer to a combination of a microcontroller, memory, and input/output peripherals—that has a dedicated function within a larger system.

As used herein, the term "Networked" is used to refer to connected via Ethernet.

As used herein, the term "High availability" is used to refer to a device or application that can operate at a high level, continuously, without intervention, for a given time period. High-availability infrastructure is configured to deliver quality performance and handle different loads and failures with minimal or zero downtime.

As used herein, the term "Intrinsically Safe (IS)" is used to refer to an approach to the design of equipment going into hazardous areas that reduces the available energy to a level where it is too low to cause ignition as certified by per IEC TS 60079-39 or ATEX.

In accordance with embodiments, various systems and methods are provided for an edge framework on an embedded device, such as a constrained device. For example, disclosed herein is an embedded, prioritized multi-tasking, preemptive, run to completion, OS-less run to completion microcontroller firmware framework. The framework can enable simultaneous, analog measurement, digital I/O, compute (i.e., machine learning), and control on a signal microcontroller based embedded platform with no operating system. The framework also can enable improved scheduling of prioritized tasks using combination of Active Object UML state machines and real-time threaded task execution of third-party open source stacks. Additionally, the framework can provide for a Centralized Data Manager used to abstract data subscriptions between modules.

As will be appreciated from further discussions herein and a review of the drawings, the framework supports network connections and simultaneous Field Bus connections. Additionally, the framework allows measurement calculations and Machine Learning computations to run in a prioritized scheme while servicing I/O on the same microcontroller. The run to completion model tasks combined with the pre-emptive/prioritized multi-tasking enable the novel features to be load balanced for performance based on the priorities with no addition developer specification or implementation (e.g., blocking conditions or checks). Built in instrumentation tasks running at lowest priority allows the user to measure performance and task tune priorities as well as set I/O latency watermarks.

It is understood that the disclosed invention may be found suitable for use in numerous applications. The applications may include, for example, Oil and Gas, Energy, Food and Beverage, Water and Wastewater, Chemical, Petrochemical, Pharmaceutical, Metal, and Mining and Mineral applications.

The various systems and method described herein can provide technical benefits and advantages, including but not limited to: the ability to perform control and other tasks at the edge in an IS or other region of an industrial process or plant (e.g., edge controller for field instruments), the ability to perform machine learning (ML) tasks at the edge device to reduce an amount of communication bandwidth consumed; the ability to perform control closer to the equipment in an IS region or other region of an industrial process or plant to improve control, safety and efficiency over the operations of the process or plant; the ability to provide for autonomous field device in IS or other region for a process or plant; the ability to provide a bridge device which can enable the integration of field devices/instruments which employ communication protocols that are unable to be employed with Ethernet-APL, e.g., existing legacy or other types of field instruments which use analog-type communications (e.g., 4-20 mA, HART, etc.); and generally the ability to provide flexibility in the design and update of new and existing control/monitoring systems for industrial plants and processes.

For example, the embedded device of the system and method of the present disclosure can be employed with existing legacy field devices/instruments, which can for example use analog type connections and protocols (e.g., 4-20 mA, HART, etc.) as well as digital connections and protocols, in a process or plant which may be upgraded with Ethernet-APL or similar capabilities. The embedded device also may be used with sensitive process/plant equipment, such as de-salinization equipment (e.g., salt removing membrane), which is very expensive and can be easily damaged. The embedded device can be placed in proximity to such sensitive equipment to increase monitoring and control-reaction time/speed over the operation of the equipment, e.g., faster reaction to address undesirable equipment operating conditions.

These and other examples of the systems and methods will be described below with reference to the figures.

Figure 1:
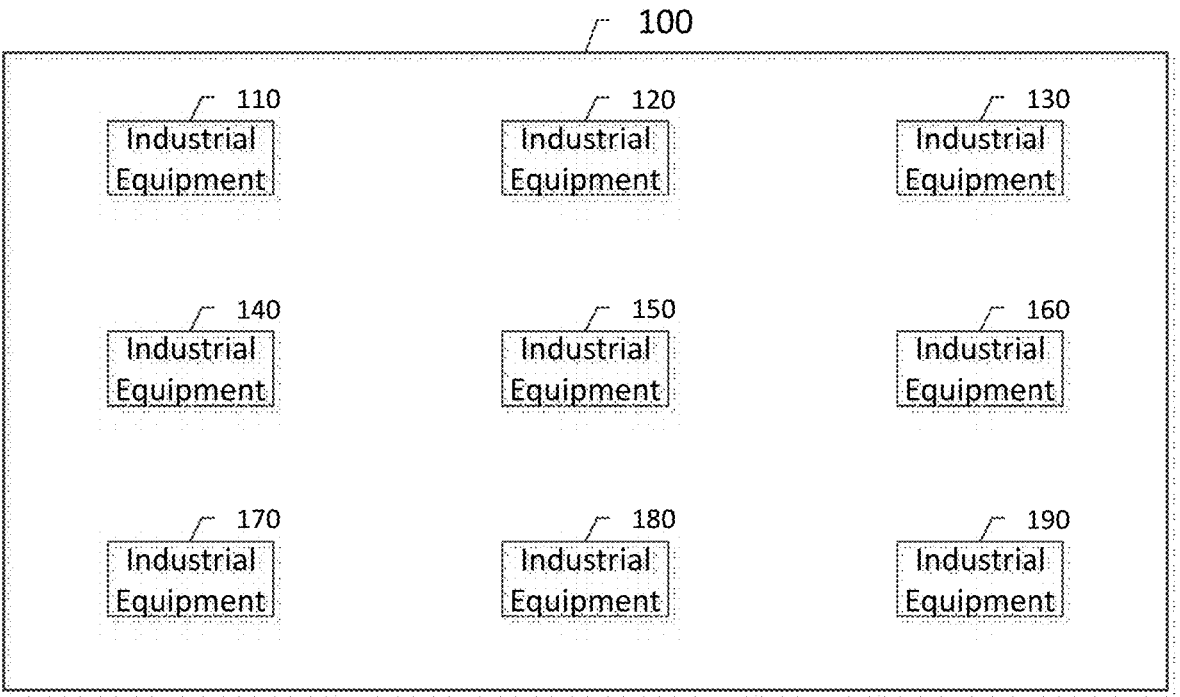
FIG. 1 shows an example industrial operation in accordance with embodiments of the disclosure.

Referring to FIG. 1, an example industrial operation 100 in accordance with embodiments of the disclosure includes a plurality of industrial equipment 110, 120, 130, 140, 150, 160, 170, 180, 190. The industrial equipment (or devices) 110, 120, 130, 140, 150, 160, 170, 180, 190 may be associated with a particular application (e.g., an industrial application), applications, and/or process(es). The industrial equipment 110, 120, 130, 140, 150, 160, 170, 180, 190 may include electrical or electronic equipment, for example, such as machinery associated with the industrial operation 100 (e.g., a manufacturing or natural resource extraction operation). The industrial equipment 110, 120, 130, 140, 150, 160, 170, 180, 190 may also include the controls and/or ancillary equipment associated with the industrial operation 100, for example, Field Devices (e.g., RTUs, PLCs, actuators, sensors, HMIs) that are used perform, analyze and/or control process variable measurements. In embodiments, the industrial equipment 110, 120, 130, 140, 150, 160, 170, 180, 190 may be installed or located in one or more facilities (i.e., buildings) or other physical locations (i.e., sites) associated with the industrial operation 100. The facilities may correspond, for example, to industrial buildings or plants. Additionally, the physical locations may correspond, for example, to geographical areas or locations.

The industrial equipment 110, 120, 130, 140, 150, 160, 170, 180, 190 may each be configured to perform one or more tasks in some embodiments. For example, at least one of the industrial equipment 110, 120, 130, 140, 150, 160, 170, 180, 190 may be configured to produce or process one or more products, or a portion of a product, associated with the industrial operation 100. Additionally, at least one of the industrial equipment 110, 120, 130, 140, 150, 160, 170, 180, 190 may be configured to sense or monitor one or more parameters (e.g., industrial parameters) associated with the industrial operation 100. For example, industrial equipment 110 may include or be coupled to a temperature sensor configured to sense temperature(s) associated with the industrial equipment 110, for example, ambient temperature proximate to the industrial equipment 110, temperature of a process associated with the industrial equipment 110, temperature of a product produced by the industrial equipment 110, etc. The industrial equipment 110 may additionally or alternatively include one or more pressure sensors, flow sensors, level sensors, vibration sensors and/or any number of other sensors, for example, associated the application(s) or process(es) associated with the industrial equipment 110. The application(s) or process(es) may involve water, air, gas, electricity, steam, oil, etc. in one example embodiment.

The industrial equipment 110, 120, 130, 140, 150, 160, 170, 180, 190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110, 120, 130, etc. may each have independent functionality.

As discussed herein, the industrial operation 100, and its associated equipment and process(es), may be operated and controlled using a Distributed Control System (DCS) in some instances.

Figure 2:
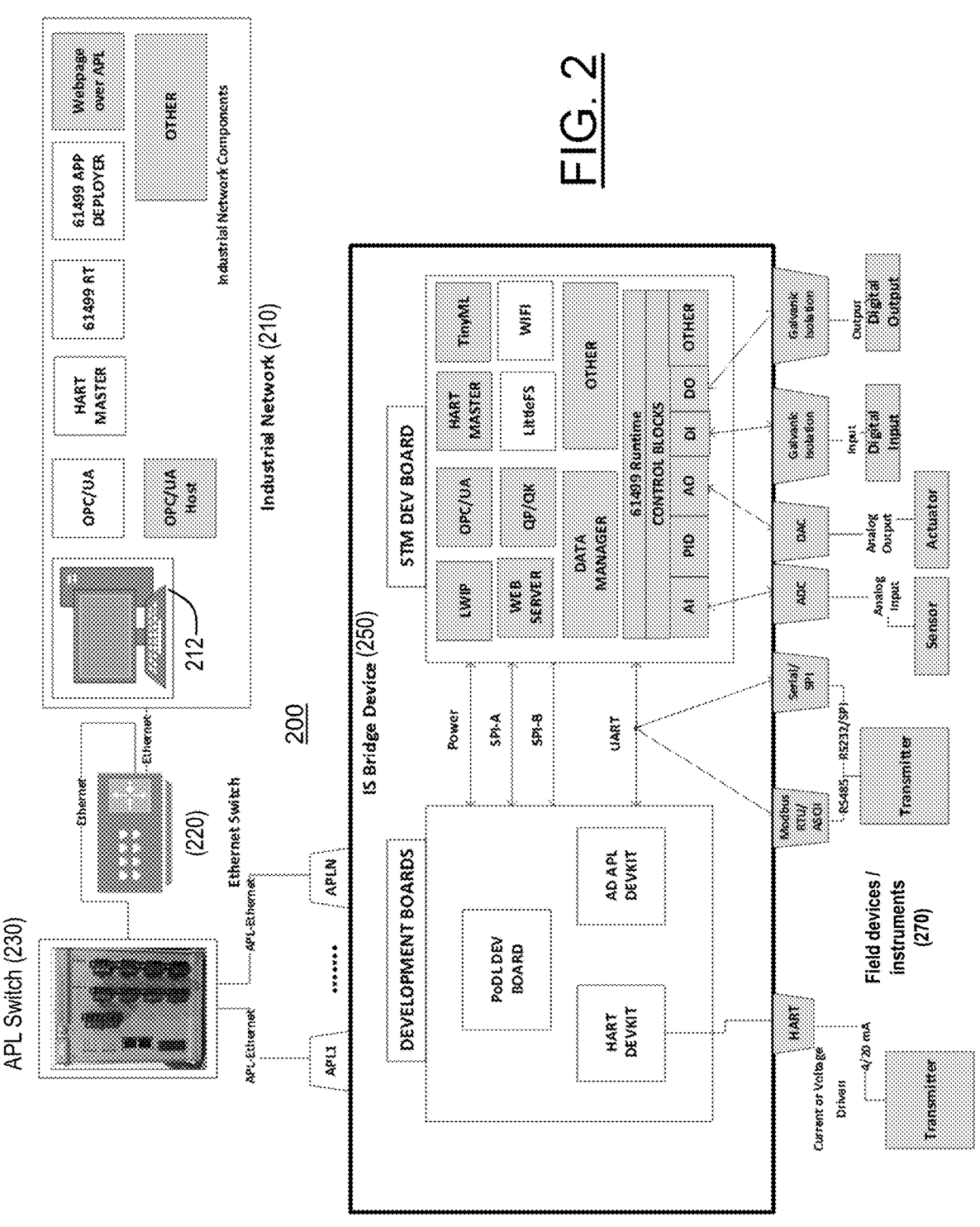
FIG. 2 illustrates an example system block diagram in accordance with embodiments of the disclosure.

FIG. 2 illustrates a block diagram of an example networked system 200 in accordance with embodiments of the disclosure. The system 200 can be a monitoring and control system for an a process or plant, such as an industrial process or plant, in which equipment to be monitored and controlled may be situated in an intrinsically safe (IS) environment or region due to hazardous conditions. A computer system(s) of in an industrial network can communicate with equipment such as field devices/instruments in the IS region, using Ethernet-APL which is a physical layer that can support EtherNet/IP, HART-IP, OPC-UA, PROFINET, or other higher-level protocol(s). Ethernet-APL can be provided across 2-wire cable, which supports the exchange of communication signals with field devices/instruments as well as the distribution of energy to such devices, in an intrinsically safe manner.

For example, the system 200 can include a network 210 of computer system(s) 212 communicatively connected across a network(s), at least one Ethernet switch 220 (e.g., Ethernet router(s)), at least one APL switch 220, and at least one embedded device such as a bridge device(s) 250 which is communicatively connected to at least one field device/instrument 270. The field device(s)/instrument(s) 270 can include analog and/or digital devices, which can include sensor(s), actuator(s), positioner(s), transmitter(s) and other field devices/instruments, including conventional field instruments used in industrial processes or plants. The computer system(s) 212 in the network 210 can exchange communication with the field devices/instruments, such as with the bridge device 250 or with the device(s) 270 across the bridge device 250, and over the Ethernet network provided through the Ethernet switch 220 and the APL switch 230. In this example, the computer system(s) 212 and the bridge device 250 can exchange communications over OPC/UA protocol, in a client-server or similar way in which the bridge device 250 can act as a Web Server or Host to provide the computer system(s) 212 and its user access to various information and functions, through a web page in response to client requests. Such information and functions can be related to monitoring and control of a plant or process, including measurement data of monitored process variable(s), report(s), alarm(s), notification(s), and other information, which may relate to the bridge device 250 (and its components) and/or operation of equipment in the IS region which is monitored or controlled by field devices/ instruments.

The bridge device 250 can be an embedded computing device, which can include processor(s), memory, analog/ digital communication interface(s), and a power unit/system for distributing a supply of power to electrical components of the device 250. The power unit/system can receive a supply of power from an external source such as via the Ethernet-APL cable or wiring, and/or a re-chargeable battery. In various embodiments, the bridge device 250 can include a microcontroller(s) having a processor(s), memory and analog and/or digital input(s)/output(s) (I/O(s)) peripherals. The microcontroller(s) can also include signal converters (e.g., Analog-to-Digital Converter (ADC), Digital-to-Analog Converter (DAC), etc.), signal generators, or signal conditioners. Furthermore, the bridge device 250 can include communication interfaces including analog and/or digital communication interface(s) for communicating with the device(s) 270 and a network communication interface(s) for communicating with computer system 212 or other field devices (e.g., other embedded devices/edge devices, etc.) across the APL switch 230. The digital I/O communication interfaces can provide for galvanic isolation. In this example, computer or electronic components, such as APL Bridge Board and STM Development Board, which can be programmed, are used to develop and test virtual environments, such as of the bridge device 250, its components, and its functions and operations (including those described herein). In various embodiments, the bridge device 250 can be an embedded edge device, and/or constrained device.

The bridge device 250 or its components may use signal conversion circuitry for I/O operations depending on the type of field device and connection thereto, e.g., analog connection or digital connection. By way of example, in a control loop scenario using an analog-type sensor(s) and actuator(s), the bridge device or its components (e.g., microcontroller, communication interface, etc.) can include an ADC for converting analog measurement signals received from the sensor(s) over an analog connection to digital signals for processing. The bridge device also can include a DAC (which may include the use of PWM or ON/OFF signals) for supplying or outputting an analog control signal to the actuator(s) over an analog connection. The interface with a transceiver(s) of the bridge device 250 can be implemented through serial or other communication using protocols such as UART (universal asynchronous receiver transmitter), SPI (serial peripheral interface), or other interface circuit (or circuitry).

The bridge device 250 is an embedded computing device with a firmware framework, e.g., a microcontroller-based firmware framework without an operating system (OS). The firmware framework, when applied on the bridge device 250 and hardware components thereof, provides an embedded OS-less framework platform (e.g., software/firmware and hardware) through which the device is configured to perform various event-driven tasks and associated functions. The tasks can, for example, include measurement operation(s) (e.g., sampling measurement data, performing measurement calculations, etc.), computation operation(s) including ML operation(s) and/or process control operation(s) (e.g., Proportional Integral Derivative (PID) controller/control loop(s)/control block(s), etc.), analog and/or digital I/O operation(s), control operation(s) and/or other device operations, which can be performed simultaneously and/or asynchronously. For example, in some embodiments, the framework platform can provide for simultaneous, analog measurement, digital I/O, compute (i.e., machine learning), and control on a signal microcontroller-based embedded platform with no operating system. The framework platform also can support network connections and simultaneous Field Bus connections.

In various embodiments, the framework platform can be configured to provide a priority and preemptive multi-tasking scheme for scheduling and executing event-driven tasks, which can be configured to run to completion or RTC. The framework platform can provide for such improved scheduling of prioritized tasks (e.g., event-driven tasks) using a combination of Active Object UML state machines and real-time threaded task execution of third-party open source stacks. For example, the framework platform can allow measurement calculations and Machine Learning computations to run in a prioritized scheme while servicing I/O on the same processing unit (e.g., microcontroller). The run to completion or RTC model tasks combined with the pre-emptive/prioritized multi-tasking can allow for load balancing for performance based on the priorities with no additional developer specification or implementation (e.g., blocking conditions or checks). The framework platform can include built-in instrumentation (or other) tasks, which can run at a lowest priority (or lower priority) to allow the user to measure performance and task tune priorities as well as set I/O latency watermarks.

As shown in the example of FIG. 2, the bridge device 250 can include various functional/software/firmware modules through the framework platform to support or control autonomously various operations of the device as described herein. The modules can include LWIP, OPC/UA, HART MASTER, TinyML, QP/QK, Data Manager, Web Server and other functional or software/firmware modules (e.g., WIFI support, LittleFS support, etc.). The modules also can provide for an IEC 61499 runtime environment, which can execute or run various control blocks. The control blocks can include: input/output operations including analog input (AI), analog output (AO), digital input (DI), and digital output (DO); control operations (e.g., PID or other process control scheme)) and/or other operations or functions (e.g., ML app, etc.). The Digital Inputs (DI), Digital Outputs (DO), Analog Inputs (AI), and Analog Outputs (AO) enable communication and control between the processor(s)/microcontroller(s) and devices in a system or process. In various embodiments, the framework platform can implement a 4diac FORTE, which is a small portable implementation of an IEC 61499 runtime environment, to execute or run control applications (e.g., I/O, calculate, compute, control, etc.) to perform various operations and functions on or through the bridge device 250 including those described herein.

Lightweight TCP/IP (LWIP) is a TCP/IP stack for embedded platforms, which can support a significant number of networking protocols in the TCP/IP suite. LWIP can facilitate easy migration of existing network or socket applications to an embedded platform.

The Open Platform Communications Unified Architecture (OPC UA) framework can support client/server services and protocols and publish/subscribe (PubSub) models and protocols. OPC UA can run on a dedicated client and server relationship. In the Pub Sub scenario, the server can send (publish) data to the network, and the client (who subscribed) will receive the data. The OPC UA PubSub communication model can provide an optimized Publish Subscribe model for various use cases, including those in which Client/Server Subscription may not be appropriate or available. The OPC UA Stack can implement serialization, security and transport of messages exchanged between different UA Applications.

HART is a bi-directional communication protocol that provides data access between a master host system(s) and a slave field device(s), e.g., a 4-20 mA analog signal (also referred to as "4 to 20 mA") which may also include an embedded digital signal. The 4-20 mA signal can communicate a primary measured value (in the case of a field device) using the 4-20 mA current loop. HART MASTER refers to the functionality on the master-side for the HART protocol.

TinyML is a type of machine learning, which can involve hardware, algorithms, and software that can, for example, analyze sensor data on a device. TinyML can allow ML model to run with low power consumption, thereby making it useful for constrained devices.

QP ("Quantum Platform") is a family of open source real-time embedded frameworks (RTEFs) and runtime environments based on active objects (Actors) and hierarchical state machines (e.g., UML (Unified Modeling Language) state machine or statecharts). In general, a state machine (including UML state machines) can assume that a state machine completes processing of each event or tasks associated therewith (e.g., event-driven tasks) before it can start processing the next event, also referred to as run to completion or RTC. The QP RTEFs can include a selection of built-in real-time kernels, such as for example the cooperative QV kernel, the preemptive non-blocking QK kernel, and the unique preemptive, dual-mode (blocking/non-blocking) QXK kernel. The QP RTEFs can run standalone, completely replacing the traditional Real Time Operating System (RTOS). QK (Preemptive Kernel) is a preemptive non-blocking run-to-completion kernel, which is designed for executing state machines in a run-to-completion (RTC) fashion.

Data Manager can manage various types of data handled through the bridge device 250, including directing different types of data to an appropriate module(s) or associated filing location in a file system. Data Manager can be a Centralized Data Manager, which can be used to abstract data subscriptions between modules (see, e.g., the example of FIGS. 8A-8E).

Web Server can handle and fulfill requests (e.g., HTTP requests, etc.) from clients. The clients can interact with the Web Server through Web pages. The requests can include requests for information or for some other action to be taken. The requested information can include data related to the monitoring/control of a process or plant (e.g., measurement data for a process variable (e.g., flow rate, temperature, de-salinization percentage, etc. over time), reports, alarms, notifications, etc.).

In operation, the bridge device 250 can perform various functions and operations (including those described herein). For example, the bridge device 250 can perform I/O operations, across analog communication interface(s) and/or digital communication interface(s) (which may have galvanic isolation) with the devices 270. The I/O operations can use various communication protocols/connections (e.g., HART, Modbus Remote Terminal Unit (RTU)/ASCII, Serial/SPI, Fieldbus and/or other known communication protocols and connection architecture for use with field devices/instruments/industrial network systems). In this capacity, the bridge device 250 can act as a bridge between the networked computer system 212 or networked control system (e.g., PLC, DCS, etc.) and the device(s) 270, which may be incompatible with Ethernet-APL. For example, one of the field devices/instruments 270 can employ HART protocol, which uses an analog connection (e.g., 4-20 mA) (and possibly a digital connection as well) to communicate with other devices, such as for example the bridge device 250. In various embodiments, the bridge device 250 can perform simultaneous I/O operations across analog and/or digital connections using the same or different communication protocols, with one or more field devices/instruments 270 according to the programs running on the framework platform. Various examples of monitoring/control programs are shown and described with reference to the examples of FIGS. 5, 7 and 13.

It should be understood that the bridge device 250 and its components (including the number and types of modules) are provided simply as an example of an embedded device. In some embodiments, the bridge device 250 can have incorporated therein (or be incorporated into) a field device/instrument 270, such as a sensor, an actuator, a positioner, a transmitter, or other field device/instrument used in industrial processes or plants.

Figure 3:
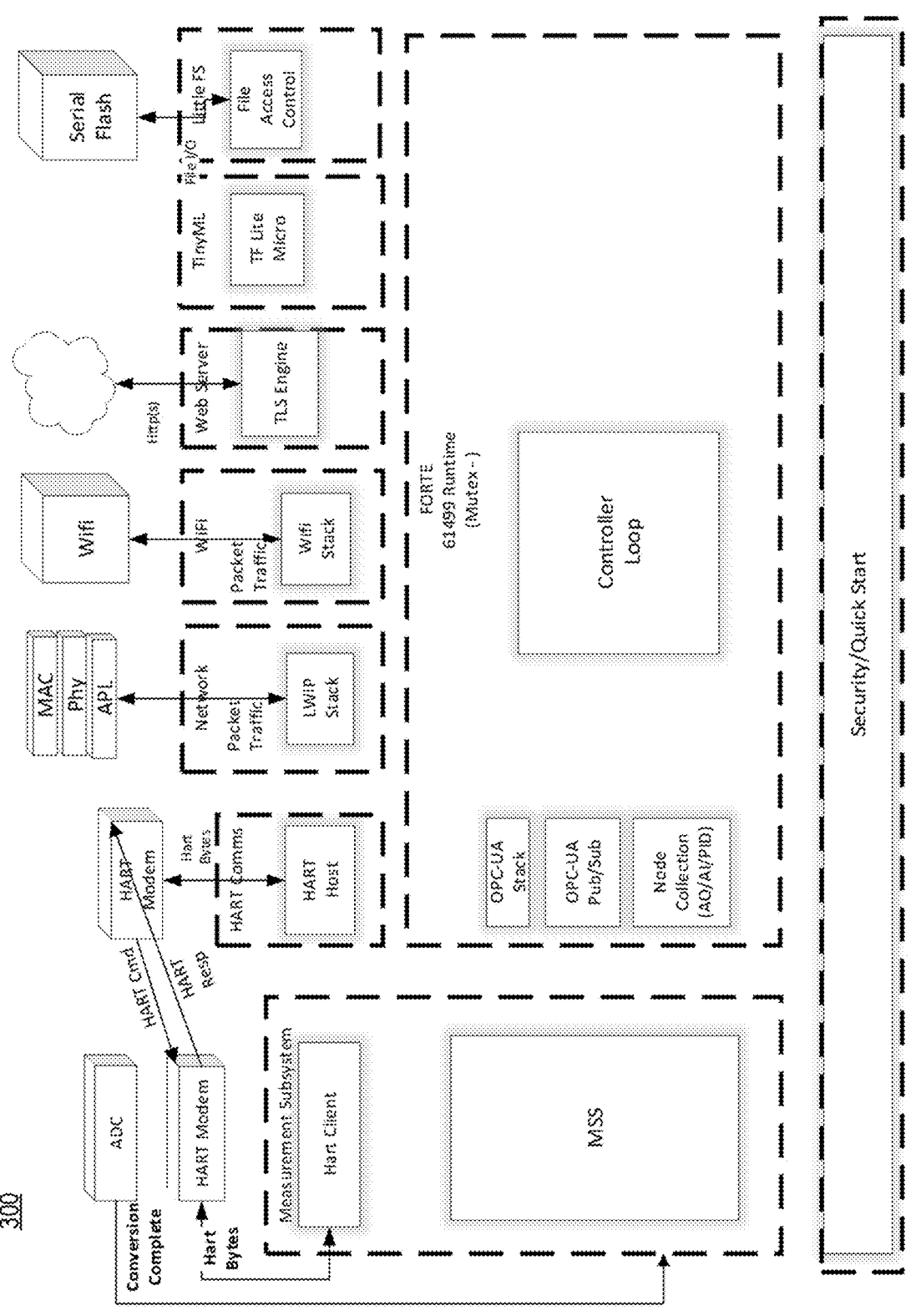
FIG. 3 illustrates an example microcontroller framework tasking model in accordance with embodiments of the disclosure.

FIG. 3 illustrates an example microcontroller framework tasking model 300 in accordance with embodiments of the disclosure. In accordance with some embodiments of this disclosure, many modules (boxes) can be implemented using UML model-based finite state machines, acting as Actors. The framework tasking model 300 can be applied to provide a framework platform on an embedded device to implement various tasks, including I/O operations, calculation, compute, control and other operations, including those described herein. In various embodiments, the embedded device can be a bridge device (e.g., 200 in FIG. 2), edge device, and/or a constrained device, which can be employed (or communicate) with one or more field devices/instruments or other measurement or control system in an industrial application to facilitate monitoring and/or control over the operations of an industrial process or plant.

As shown in FIG. 3, in this example, the framework tasking model 300 can include various modules, such as: a FORTE runtime environment (IEC 61499) for running various control blocks including Controller Loop, OPC-UA Stack, OPC-UA Pub/Sub and Node Collection (Analog output (AO)/Analog Input (AI)/Proportional/Integral/Derivative (PID) control); File Access Control using Little FS, TF Lite Micro (TensorFlow Lite for Microcontrollers) to run TinyML machine learning (ML) models or applications; Transport Layer Security (TLS) Engine for implementing encryption to secure Web Server communications; WiFi Protocol Stack for implementing WiFi communication via RF transmitter/receiver or transceiver; Lightweight TCP/IP (LWIP) to conduct communication over a network; and HART Host through which to perform HART communication as the host system with a measurement subsystem over a HART communication interface (e.g., HART modem). The modules also can include modules for performing Security/Quick Start/Instrumentation Task.

In various embodiments, the framework tasking model 300 can be implemented through QP/QK RTEF(s) or other similar platform(s) to provide an OS-less framework platform which can run standalone and replace traditional Real Time Operating System (RTOS).

Figure 4:
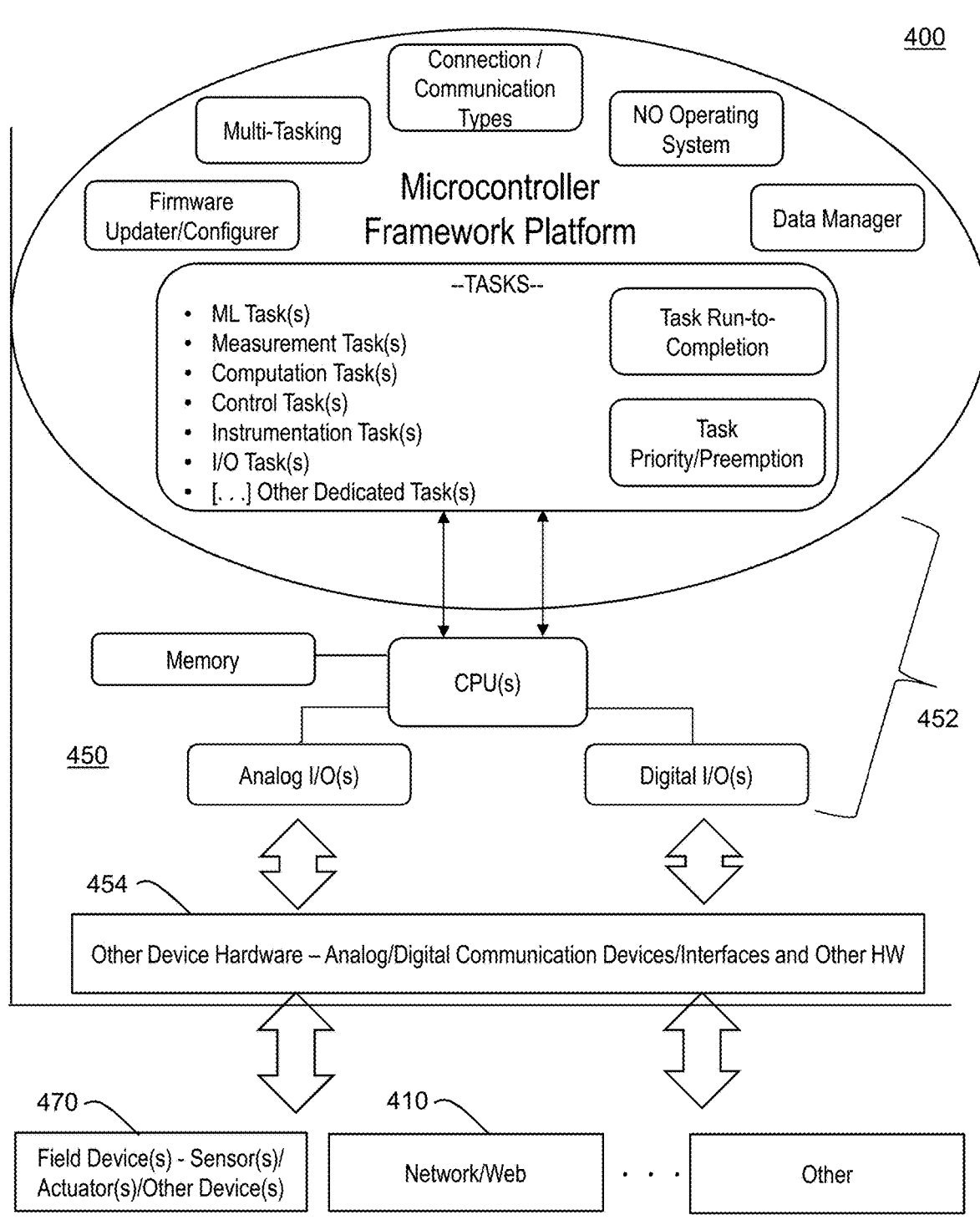
FIG. 4 illustrates a block diagram of example components of a microcontroller-based embedded device with a framework platform in a system environment in accordance with embodiments of the disclosure.

FIG. 4 illustrates a block diagram of a system environment 400 showing example hardware and software components of a microcontroller-based embedded device with a framework platform in accordance with embodiments of the disclosure. As shown in FIG. 4, the system environment 400 can include an embedded device 450 which can interact with field device(s)/instrument(s) 470, a networked computer system(s) 410 or other intelligent or non-intelligent devices or system.

In this example, the embedded device 450 can include a microcontroller(s) having a processor(s) (e.g., CPU(s)), memory and Analog and/or Digital I/O peripherals, as well as other equipment such as communication interfaces (e.g., transceivers, transmitter/receiver, modem and associated connectors) through which to communicate with field devices/instruments or other devices via industrial communication protocols (e.g., HART, FIELDBUS, MODBUS RTU, SERIAL, etc.) and/or with network devices/systems using Ethernet-APL, WiFi or other network communication protocol. The processor(s) of the device 450 can apply an embedded microcontroller-based firmware framework to provide an OS-less framework platform. The framework platform can provide for various functionality, including performing communications with the same or different devices over different types of communication connections/protocols, providing for a centralized data manager, providing for firmware update (including update of the framework or modules thereof); providing for multi-tasking; and providing for other dedicated operations depending on the application for the embedded device.

The framework platform can perform event-based tasks, which can run to completion but are subject to priority and preemption. The tasks can include built-in or other tasks, including ML Tasks, Measurement Tasks, Computation Tasks, Control Tasks, Instrumentation Tasks, I/O tasks and other dedicated tasks, which may be associated with the control and operation of the embedded device 450 and monitoring/control of operations for an industrial process or plant.

FIG. 5 illustrates an example system 500 with an example embedded device 550, field devices/instruments 570A and 570B, and APL switch 520 in accordance with embodiments of the disclosure. The system 500 can be a monitoring and/or control system for an industrial process or plant. In the system 500, the field devices/instruments can include the embedded device 550 and field devices/instruments 570A and 570B, which are located in an IS region or other region near the monitored or controlled equipment. The field device/instrument 570A is a sensor(s) to monitor/measure process variable(s) (e.g., temperature, flow rate, pressure, etc.), and the field device/instrument 570B is an actuator(s) for controlling an operation of equipment in the process or plant.

As shown, the embedded device 550 can have implemented thereon an OS-less embedded framework platform for autonomously controlling the operations of the device, such as I/O operation(s), calculation operation(s), computation operation(s), control operation(s), ML operation(s), measurement operation(s) which may involve I/O and calculation operations, and and/or other operation(s). The various operations or combinations thereof may be implemented simultaneously (e.g., simultaneous communication connections with different communication protocols, simultaneous I/O and measurement operation(s), etc.). As described herein, the framework platform can perform a multi-tasking scheme with prioritized and preemptive scheduling of tasks, which are intended to run to completion or RTC.

In this example, the embedded device 550 can communicate with a networked computer system(s), via the APL switch 520 across an Ethernet network, and can receive a supply of power from the Ethernet-APL cable or wiring to power the electrical components of the device. The embedded device 550 also can communicate with the field devices/instruments 570A and 570B using the same or different communication protocols, such as industrial protocols which may employ analog or hybrid connection (e.g., HART protocol including 4-20 mA, or other known industrial analog communication protocols) or may employ digital connection (e.g., Fieldbus protocol, Modbus protocol, or other known industrial digital communication protocols). The embedded device 550 can be an edge device and/or a constrained device.

In various embodiments, the embedded device 550 can be configured to receive measurement data from the field device/instrument, such as the sensor(s) 570A, via a first communication interface provided on the device. The measurement data can include measurements of a process variable(s) for a process. The embedded device 550 can employ the measurement data as process input to control operations of the process or equipment thereof. For example, the embedded device 550 can employ the measurement data in a control loop(s), e.g., PID control loop, to generate control signals for a control element in order to maintain process variables (PVs) at a desired value or set point (SP). The embedded device 550 can transmit the control signals to the control element, in this case, a field device/instrument such as the actuator(s) 570B. Depending on the process application, the actuator(s) 570B can actuate process equipment, such as valve(s), damper(s), fluid coupling(s), and other device(s) used in industrial process control. The measurement data from the sensor(s) 570A can be received by the device 550 through an analog or hybrid connection using a first type of communication protocol, and the control signal can be transmitted by the device 550 across a digital connection using a second communication protocol which can be different than the first type of communication protocol. The embedded device 550 can implement these I/O operations across different types of connections simultaneously.

In various embodiments, the embedded device 550 also can be configured to act as a bridge (or a bridge device) to facilitate the exchange of data between the networked computer system(s) and the field devices/instruments 570A and 570B. For example, the networked computer system(s) can request and receive, via the bridge device 550, diagnostic or other information (e.g., measurement data, configuration data, notification data, alarm data, etc.) from the field devices/instruments 570A and 570B. Alternatively, the bridge device 550 can be configured to publish such information to subscribing clients, including the networked computer system(s). The networked computer system(s) also can update a configuration, including software/firmware update, of the field devices/instruments 570A and 570B through the bridge device 550, which can be configured to facilitate or perform such updates or changes on behalf of or at the request of the networked computer system(s). As described herein, in various embodiments, the bridge device 550 can operate as a Web Server through which requests from the networked computer system(s) provided via a Web page(s) can be fulfilled by the bridge device 550.

In various embodiments, the embedded device 550 may interact with other field devices/instruments, such as other embedded devices like the device 550, to coordinate monitoring and control operations for the process or plant, locally in the IS or other region. Accordingly, a plurality of embedded devices 550 can be employed individually or in combination to monitor and/or control a sub-process or subsystem of the process or plant. For example, instead of implementing both receipt of measurement data and the output of control signals, these operations can be implemented on separate embedded devices, which can communicate across the APL switch 520 or other connection suitable for use in IS region.

FIG. 6 illustrates a flow diagram of an example process 600 by which operations of an embedded device is performed in accordance with embodiments of the disclosure. By way of example explanation, the process 600 will be described with reference to an embedded device (e.g., examples in FIGS. 2-6, 13 and 14) and components thereof. The components can include, for example, a processor(s), memory and I/O peripherals, which may take the form of a microcontroller(s). The embedded device can be an embedded edge device and/or constrained device.

Turning to the process 600, at block 610, the processor(s) can receive and update firmware framework or components/modules thereof of on the embedded device, through updates which may be provided by a networked computer system (e.g., periodically, automatically, at the request of a user, at the request of the embedded device, etc.), provided locally by a user at the device (e.g., memory card or device with updates, user input, etc.), or provided in some other fashion. The firmware framework can be an OS-less framework without an operating system (OS). The operations of block 610 can be optional.

At block 620, the processor(s) can apply the firmware framework on the embedded device to provide an embedded OS-less framework platform to control the operations of the device. In this way, the embedded device can be an autonomous device (e.g., a device which operates autonomously) in an IS or other region which may be subject to operational constraints (e.g., power, bandwidth, etc.).

At block 630, the processor(s) can perform prioritized, multi-tasking of a plurality of run-to-complete tasks for monitoring and/or control of a plant or process in an intrinsically safe region according to the embedded framework platform. The tasks can be event-driven tasks. In various embodiments, the task prioritization and preemption in the multi-tasking scheme can be implemented using QP/QK RTEFs, such as described herein.

Furthermore, in various embodiments, the operation(s) in block 630 can include a sub-block 630A in which the processor(s) schedules the execution of tasks (e.g., measure, I/O, calculate, compute, control, run ML app, etc.) with prioritization and preemption based on a priority of each task to control device operations, according to the embedded framework platform. The device operations can relate to monitoring and/or control of the plant or process in an IS or other region. At a sub-block 630B, the processor(s) executes tasks or continues the execution of tasks so they run to completion with prioritization and preemption based on a priority of each task, according to the embedded framework platform.

FIG. 7 illustrates a flow diagram of an example process 700 by which operations of an embedded device is performed to monitor and control an operation(s) of a process or plant in accordance with embodiments of the disclosure. By way of example explanation, the process 700 will be described with reference to an embedded device (e.g., examples in FIGS. 2-6, 13 and 14) and components thereof. The components can include, for example, a processor(s), memory and I/O peripherals, which may take the form of a microcontroller(s). The embedded device can be an embedded edge device and/or constrained device.

The process 700 begins at block 710 in which the processor(s) samples measurement data from a first field device/instrument, which is received via an analog connection, according to a framework platform.

At block 720, the processor(s) performs computations for controlling equipment according to control algorithm (e.g., PID or ML app or program) based on the sampled measurement data or data calculated, computed or derived from the measurement data.

At block 730, the processor(s) controls equipment by sending a control signal over an analog or digital connection to a second field device/instrument based on the computations. For example, the processor can generate (or control generation) of a control signal for use in controlling the operation of the second field device/instrument, which in turn controls operational aspects of the process or plant.

The method 700 is simply provided as an example. As described herein, instead of implementing both receipt of measurement data and the output of control signals, these operations can be implemented on separate embedded devices, which can communicate across the APL switch 520 or other connection suitable for use in IS region. Furthermore, various combinations of embedded devices (with framework platforms) along with other field devices/instruments, may be used to distribute various operations and functions therebetween to monitor and/or control (and provide other functionality) in IS or other operational/on-site region of an industrial process or plant.

Figure 8A:
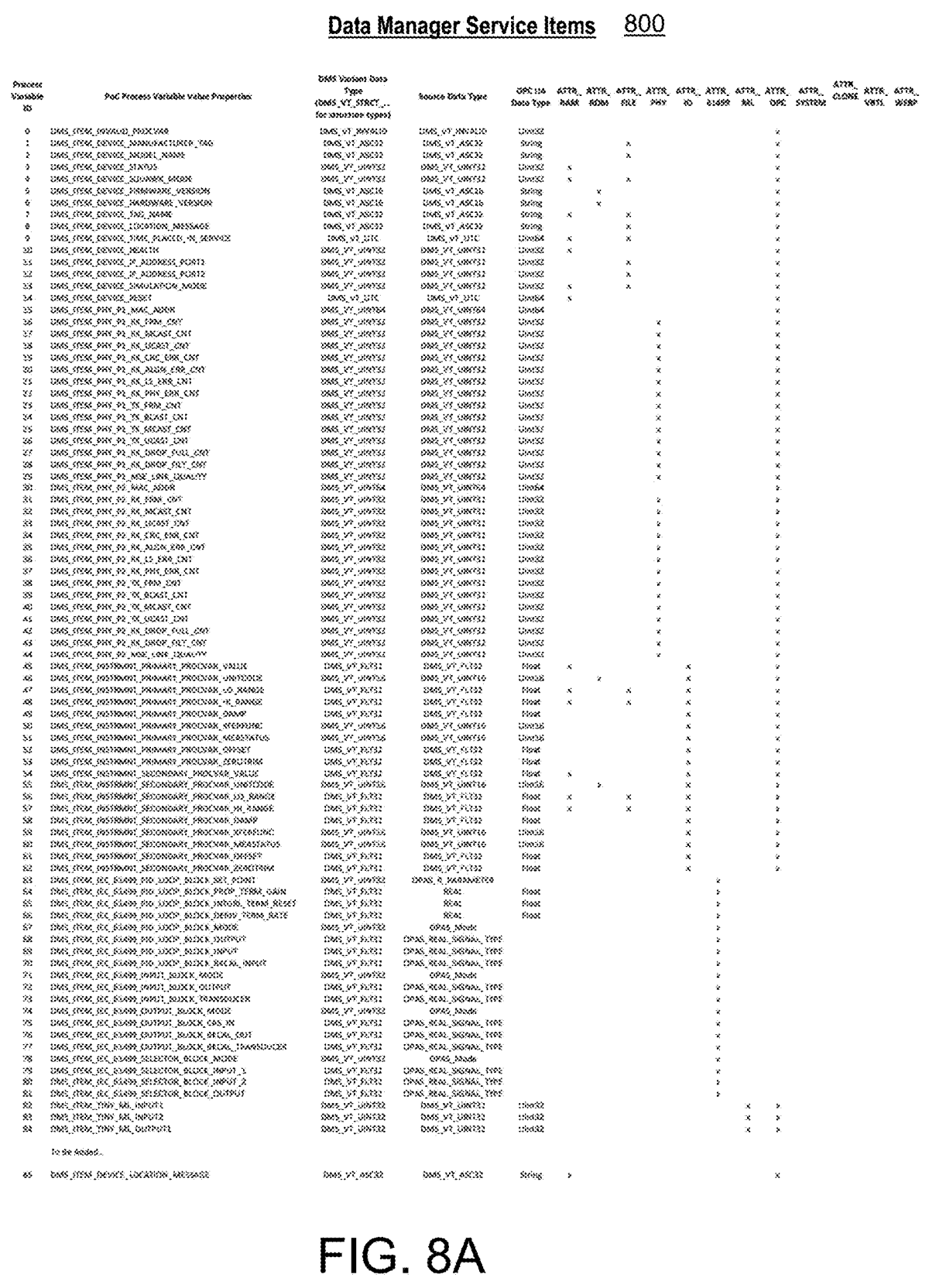
Figure 8B:
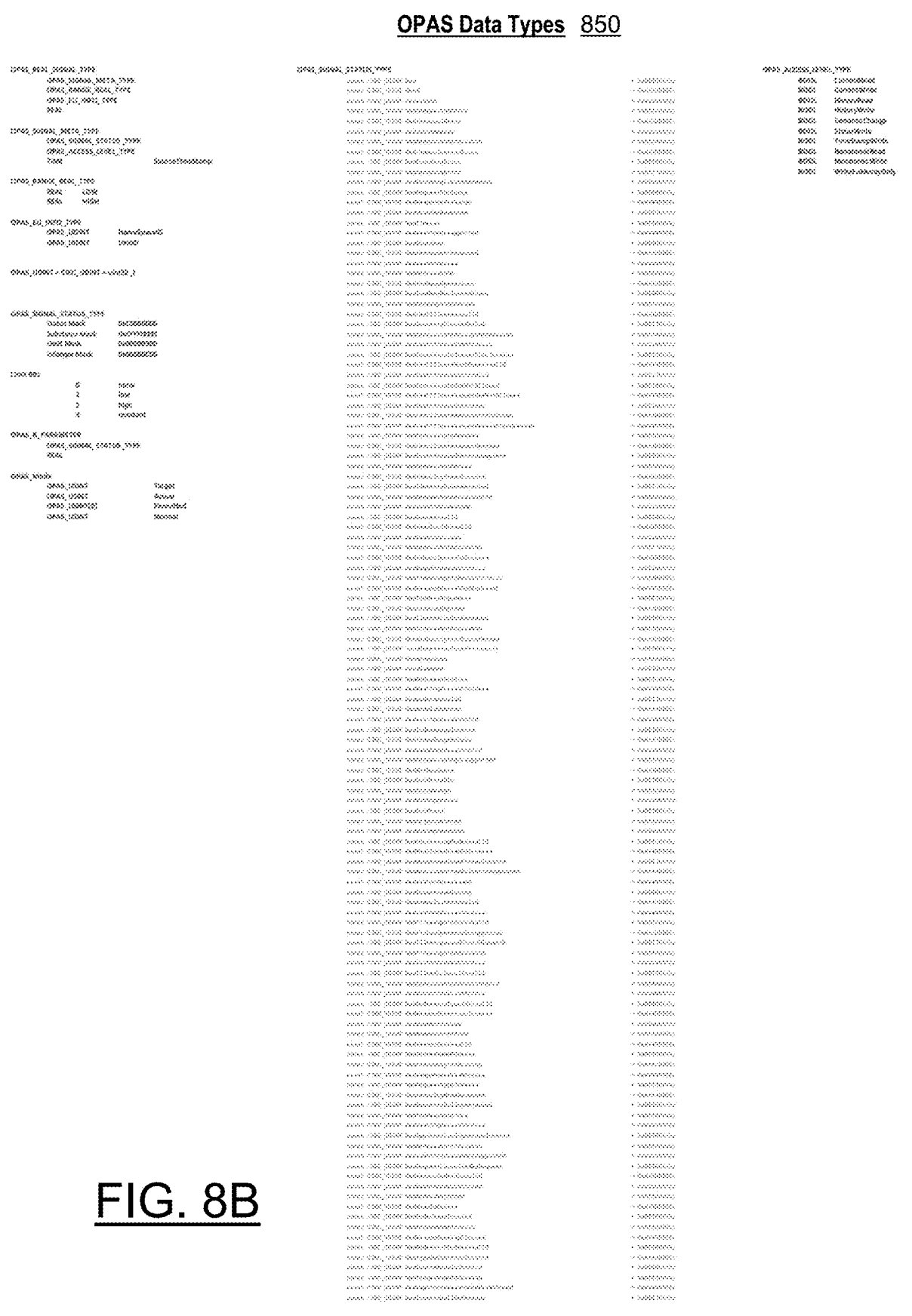

FIGS. 8A, 8B, 8C, 8D and 8E illustrate example service items 800 for a Data Manager, and OPAS data types for use in an embedded device in accordance with embodiments of the disclosure. As shown in FIG. 8A, various example service items 800 are identified/defined including their attributes or properties to facilitate the abstraction by a data manager of data subscriptions between modules for an embedded device. The example attributes or properties can include Process Variable ID, Process Variable Value Properties, DMS Variant Data Type, Source Data Type, OPC UA Data Type, ATTR_RAM, ATTR_ROM, ATTR_FILE, ATTR_PHY, ATTR_IO, ATTR_61499, ATTR_ML, ATTR_OPC, ATTR_SYSTEM, ATTR_CLONE, ATTR_VRTL and ATTR_WEBP. As further shown in FIGS. 8B-8E, the various example OPAS data types 850 also are defined. The service items and data types as shown in FIGS. 8A-8E are provided as an example. Other service items and data types may be employed according to the application.

FIG. 9 illustrates a Table 900 which provides example use cases and usages including File Type, Required (or Optional), and Estimated Usage for an embedded device in accordance with embodiments of the disclosure. Example use cases include Logging—logging for alerts/warning/assets; OPC/UA configuration XML file; 61499 application downloaded to device; Initial device configuration such as connection details IP/Ports; Web Page Serving; and TinyML configuration.

FIG. 10 illustrates a Table 1000 which provides example requirements by function for a file system of an embedded device in accordance with embodiments of the disclosure. For each function of the file system, the Table 1000 provides various Read and Write state requirements (e.g., Yes, No, Yes (Subject to RBA), TBD, etc.) when an embedded device is Online, Offline, Startup and Shutting Down. Example functions of the file system can include: System Logger, System Admin, OPC/UA, 61499 Runtime, Web Server, Hart Master, File System, Network Interface, Tiny ML, and Firmware Upgrader.

FIG. 11 illustrates a Table 1100 which provides example external roles and associated permissions for Read/Write operation in relation to an embedded device in accordance with embodiments of the disclosure. The User Roles can include Admin, Maintenance, User and Monitor. An Admin role is permitted to perform ALL Read/Write. Maintenance and User roles are permitted to perform selected Read/Write. Monitor role is permitted to only Read Logs.

FIG. 12 illustrates an example file structure 1200, such as Little FS Structure, for an embedded device in accordance with embodiments of the disclosure. The file structure 1200 is shown in a Tree Viewer, and includes the following branch folders on a first tier such as 61499, AI, HART, OPC UA, SysLog, System, and Web Page. For the System folder, there includes branch folders such as Framework, HAL, Images and Network.

FIG. 13 illustrates an example system architecture or system 1300 including an APL Switch 1320, embedded devices 1350A and 1350B, field devices/instruments 1370A and 1370B, and an Energy Recovery Device (ERD), in accordance with embodiments of the disclosure. The system 1300 can be a monitoring and/or control system for an industrial process or plant. In the system 1300, the field devices/instruments can include the embedded devices 1350A, 1350B and field devices/instruments 1370A, 1370B, which may be located in an IS region or other region employing communications using an Advanced Physical Layer, such as Ethernet-APL. The field device/instrument 1370A is a sensor such as a flow meter to monitor/measurement process variable(s) such as the flow rate of a fluid (e.g., gas, liquid, etc.), and the field device/instrument 1370B is a positioner for controlling an operational aspect of the process or plant (or equipment thereof). For example, the positioner can be a valve positioner for adjusting a fluid flow rate or fluid pressure, via a valve(s).

As shown, each of the embedded devices 1350A and B can have implemented thereon an OS-less embedded framework platform for autonomously controlling the operations of the device, such as I/O operation(s), calculation operation(s), computation operation(s), control operation(s), ML operation(s), measurement operation(s) which may involve I/O and calculation operations, and and/or other operation(s) depending on the application. The various operations or combinations thereof may be implemented simultaneously (e.g., simultaneous communication connections with different communication protocols, simultaneous I/O and measurement operation(s), etc.). As described herein, the framework platform can perform a multi-tasking scheme with prioritized and preemptive scheduling of tasks, which are intended to run to completion or RTC.

The embedded device 1350A can include a framework platform, which can provide for OPC UA Server to conduct communications across the APL switch 1320 with an OPC UA Client on a remote computer device/system (e.g., a networked computer system, etc.) or with other embedded devices, such as the embedded device 1350B using TCP/UDP—IP protocol. In this example, the framework platform of the device 1350A also is configured to provide for 4diac Flow Node and HART Master/MODBUS HART US MASTER to enable communication with the flow meter 1370A. The embedded device 1350A can receive measurement data from the flow meter 1370A, and provide the measurement data or other data calculated, computed or derived from the measurement data to the embedded device 1350B via the APL Switch 1320.

The embedded device 1350B can include a framework platform, which can provide for OPC UA Server to conduct communications across the APL switch 1320 with an OPC UA Client on a remote computer device/system (e.g., PC computer, a monitor/control computer system, etc.) or with other embedded devices, such as the embedded device 1350A using TCP/UDP—IP protocol. The framework platform of the device 1350B also is configured with 4diac 61499 run time environment to execute PID control according to process input, e.g., measurement or other related data from the device 1350A. For example, the embedded device 1350B can employ the received measurement or other data in a control loop(s), e.g., PID control loop, to generate control signals for a control element in order to maintain process variables (PVs) at a desired value or set point (SP). The framework platform of the device 1350B also is configured with 4diac Positioner Node and Hart Master/MODB HART US MASTER to transmit the control signals to the control element, in this case, the positioner 1370B. Depending on the process application, the positioner 1370B can actuate process equipment, such as valve(s) damper(s), fluid coupling(s), and other device(s) used in industrial process or plant control.

In various embodiments, the PID controller or control block in FIG. 13 may employ a process optimizer application based on information measured by the ERD. For example, in a desalinization process, the set point for PID control of the process can be based on the measured process energy recovery by the ERD to react to changes in a membrane through which the seawater flows.

Although the embedded devices 1350A and 1350B are shown as employing HART protocol to perform analog or hybrid communications with field devices/instruments 1370A and 1370B, the devices 1350A and 1350B can employ other types of communication protocols and connections, including digital protocols and connections, to perform communication with other field devices/instruments.

In various embodiments, the embedded devices 1350A and 1350B also can be configured to act as a bridge (or a bridge device) to facilitate the exchange of data between networked computer system(s) with OPC UA Client and the field devices/instruments 1370A and 1370B, respectively.

FIG. 14 illustrates an example IoT device software model 1400 for an embedded device in accordance with embodiments of the disclosure. In various embodiments, the embedded device can be a bridge device (e.g., 200 in FIG. 2), edge device, and/or a constrained device, which can be employed (or communicate) with one or more field devices/instruments to facilitate monitoring and/or control of operations of an industrial process or plant.

As shown in FIG. 14, in this example, the software model 1400 of the embedded device can include various modules, such as: a File System; a Gateway/Controller Application; a FORTE runtime environment for implementing control blocks including OPC UA Server (e.g., Open62541), 4Diac (IEC 61499) and 4Diac Field Device Node; Modbus Master; GALA Stack; HART Master; UDP (User Datagram Protocol); and TCP/IP (Transmission Control Protocol/Internet Protocol). The modules also may include Web Server, Sec-Boot, SNTP SNMPv3 and SysLog. The framework can be implemented with various hardware to provide a framework platform. Such hardware can include communication interfaces (including transceivers and connectors) for conducting communication via Ethernet, Hart mode (m/PS), and RS485. Such hardware also can include MCU (or microcontroller), memory (e.g., Non-Volatile memory), and output devices (e.g., LEDs). As further shown in FIG. 14, the software model 1400 can provide for communication with a field device/instrument over an analog connection (e.g., 4-20 mA) using the HART protocol or 4-20 mA.

FIG. 15 illustrates an example system architecture 1500 with Servers, Ethernet switches, APL switches, and field devices such as APL instruments which can include an embedded device (e.g., a bridge device) or can be connected to the embedded device, in accordance with embodiments of the disclosure. The system architecture 1500 can provide a lab environment for use in design and development of software for devices and systems, including embedded edge devices, such as described herein.

Other possible features and advantages associated with the disclosed invention will be appreciated by one of ordinary skill in the art.

It is understood that embodiments of the disclosure herein may be configured as a system, method, or combination thereof. Accordingly, embodiments of the present disclosure may be comprised of various means including hardware, software, firmware or any combination thereof.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware, or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s), controller(s) or processing unit(s) as described herein can be a processing system, which can include one or more processors, such as CPU, controller, ASIC, or other processing unit or circuitry, which controls or performs the operations of the devices or systems, described herein. Memory/storage devices can include, but are not limited to, disks, solid state drives, optical disks, removable memory devices such as smart cards, SIMS, semiconductor memories such as RAM, ROM, PROMS, etc. Transmitting mediums or networks can include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, industrial communication networks, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be appreciated that the concepts, systems, circuits and techniques sought to be protected herein are not limited to use in the example applications described herein (e.g., industrial applications), but rather may be useful in substantially any application where it is desired to receive decision support for each step in an automated fashion. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. An embedded device comprising:
   at least one network communication interface including an Ethernet-Advanced Physical Layer (APL) interface through which to conduct communications and receive power over an Ethernet-APL network connection;
   at least one analog communication interface for establishing at least one analog connection with a field device/instrument;
   at least one digital communication interface for establishing at least one digital connection with the field device/instrument;
   a memory; and
   at least one processor, in communication with the memory, configured to:

apply a firmware framework to implement an embedded platform without an operating system, wherein the firmware framework provides for measurement calculations and Machine Learning computations to run in a prioritized scheme while servicing an input/output (I/O) on a microcontroller with the at least one processor; and perform prioritized, multi-tasking of a plurality of run-to-complete tasks for monitoring and/or control of a plant or process according to the embedded platform, at least one of the tasks including communications with at least one field device/instrument through an analog connection via the at least one analog communication interface, the communications including at least receiving measurement data from the at least one field device/instrument or outputting control data to the at least one field device/instrument, wherein the at least one field device/instrument comprises a first field device/instrument and a second field device/instrument, and wherein the at least one processor receives the measurement data from the first field device/instrument across the analog connection via the at least one analog communication interface and outputs control signal or data based on the measurement data to the second field device/instrument via the at least one digital communication interface.

2. The embedded device of claim 1, wherein the firmware framework provides for simultaneous, analog measurement via one or more analog connections, digital I/O via a digital connection, and/or compute and control on a signal microcontroller-based embedded platform with no operating system.

3. The embedded device of claim 1, wherein the firmware framework provides for network connections over the at least one network communication interface and simultaneous Field Bus connections over the at least one digital communication interface.

4. The embedded device of claim 1, wherein the firmware framework provides for scheduling of prioritized tasks using a combination of active object unified modeling language (UML) or UML state machines and real-time threaded task execution of open source stacks.

5. The embedded device of claim 1, wherein the firmware framework includes a centralized data manager for abstract data subscriptions.

6. The embedded device of claim 1, wherein the at least one processor is configured to perform load balancing for performance based on priorities using run-to-completion model tasks combined with pre-emptive/prioritized multi-tasking.

7. The embedded device of claim 1, wherein the firmware framework includes built-in instrumentation tasks, which are configured to run at a lowest priority to allow a user to measure performance, to task tune priorities, and/or to set I/O latency watermarks.

8. The embedded device of claim 1, wherein the at least one field device/instrument comprises a transmitter, sensor, positioner, or actuator.

9. The embedded device of claim 1, wherein the embedded device comprises an Advanced Physical Layer or APL bridge device, or a constrained edge device.

10. The embedded device of claim 1, wherein the embedded device is configured to operate in an intrinsically safe region of an industrial process or plant.

11. A method of operating an Ethernet-Advanced Physical Layer (APL) embedded device including at least one processor, memory, input/output (I/O) peripherals and communication interfaces including at least a digital communication interface for establishing a digital connection with a field device/instrument, the method comprising:

applying, via the at least one processor, a firmware framework to implement an embedded framework platform without an operating system, wherein the firmware framework provides for measurement calculations and Machine Learning computations to run in a prioritized scheme while servicing an I/O on a microcontroller with the at least one processor; and performing, via the at least the processor, prioritized, multi-tasking of a plurality of run-to-complete tasks for monitoring and/or control of a plant or process according to the embedded framework platform, at least one of the tasks including:

conducting communications with at least one field device/instrument through at least one analog connection via an analog communication interface from the communication interfaces, the communications including at least receiving measurement data from the at least one field device/instrument or outputting control data to the at least one field device/instrument, wherein the at least one field device/instrument comprises a first field device/instrument and a second field device/instrument, and wherein the at least one processor receives the measurement data from the first field device/instrument across an analog connection via the analog communication interface and outputs control signal or data based on the measurement data to the second field device/instrument via the digital communication interface; and conducting communications and receiving power over an Ethernet-APL network connection, via a network communication interface from the communication interfaces.

12. The method of claim 11, wherein the firmware framework provides for simultaneous, analog measurement via the analog connection, digital I/O via the digital connection, and/or compute and control on a signal microcontroller-based embedded platform with no operating system.

13. The method of claim 11, wherein the firmware framework provides for network connections over the network communication interface and simultaneous Field Bus connections over the digital communication interface.

14. The method of claim 11, wherein the firmware framework provides for scheduling of prioritized tasks using a combination of active object unified modeling language or UML state machines and real-time threaded task execution of open source stacks.

15. The method of claim 11, wherein the firmware framework includes a centralized data manager for abstract data subscriptions.

16. The method of claim 11, wherein the at least one processor is configured to perform load balancing for performance based on priorities using run-to-completion model tasks combined with pre-emptive/prioritized multi-tasking.

17. The method of claim 11, wherein the firmware framework includes built-in instrumentation tasks, which are configured to run at a lowest priority to allow a user to measure performance, to task tune priorities, and/or to set I/O latency watermarks.

18. The method of claim 11, wherein the at least one field device/instrument comprises a transmitter, sensor, positioner, or actuator.

19. The method of claim 11, wherein the embedded device comprises an Advanced Physical Layer or APL bridge device, or a constrained edge device.

20. The method of claim 11, wherein the embedded device is configured to operate in an intrinsically safe region of an industrial process or plant.

21. A non-transitory computer readable medium storing computer executable code, which when executed by at least one processor of an Ethernet-Advanced Physical Layer (APL) embedded device including memory, input/output (I/O) peripherals and communication interfaces at least including a digital communication interface for establishing a digital connection with a field device/instrument, is configured to implement a method comprising:

applying, via the at least one processor, a firmware framework to implement an embedded framework platform without an operating system, wherein the firmware framework provides for measurement calculations and Machine Learning computations to run in a prioritized scheme while servicing I/O on a microcontroller with the at least one processor; and performing, via at least the at least one processor, prioritized, multi- tasking of a plurality of run-to-complete tasks for monitoring and/or control of a plant or process according to the embedded framework platform, atleast one of the tasks including:

conducting communications with at least one field device/instrument through analog connection via an analog communication interface from the communication interfaces, the communications including at least receiving measurement data from the at least one field device/instrument or outputting control data to the at least one field device/instrument, wherein the at least one field device/instrument comprises a first field device/instrument and a second field device/instrument, and the processor(s) receives the measurement data from the first field device/instrument across an analog connection via the analog communication interface and outputs control signal or data based on the measurement data to the second field device/instrument via the digital communication interface; and conducting communications and receiving power over an Ethernet-APL network connection, via a network communication interface from the communication interfaces.

\* \* \* \* \*